US009485251B2

(12) United States Patent
White et al.

(10) Patent No.: US 9,485,251 B2
(45) Date of Patent: *Nov. 1, 2016

(54) METHODS AND SYSTEMS FOR AUTHENTICATING USERS

(71) Applicant: Daon Holdings Limited, George Town (KY)

(72) Inventors: Conor Robert White, Fairfax, VA (US); Michael Peirce, Dublin (IE); Jason Scott Cramer, Vienna, VA (US); Chet Bradford Steiner, McLean, VA (US); Suzanna Diebes, Sterling, VA (US)

(73) Assignee: DAON HOLDINGS LIMITED, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/969,318

(22) Filed: Dec. 15, 2015

(65) Prior Publication Data

US 2016/0099937 A1   Apr. 7, 2016

Related U.S. Application Data

(63) Continuation of application No. 14/922,310, filed on Oct. 26, 2015, which is a continuation of application No. 13/845,444, filed on Mar. 18, 2013, now Pat. No. 9,202,028, which is a continuation of application No. 12/535,720, filed on Aug. 5, 2009, now Pat. No. 8,443,202.

(51) Int. Cl.
*G06F 21/00* (2013.01)
*H04L 29/06* (2006.01)
(Continued)

(52) U.S. Cl.
CPC .......... *H04L 63/0861* (2013.01); *G06F 21/31* (2013.01); *G06F 21/32* (2013.01);
(Continued)

(58) Field of Classification Search
CPC ...................................................... G06F 21/32
USPC .................................................. 713/182–186
See application file for complete search history.

(56) References Cited

U.S. PATENT DOCUMENTS

| 5,229,764 A | 7/1993 | Matchett et al. |
| 5,613,012 A | 3/1997 | Hoffman et al. |

(Continued)

FOREIGN PATENT DOCUMENTS

| EP | 1 172 771 | 1/2002 |
| JP | 2002-269479 | 9/2002 |

(Continued)

OTHER PUBLICATIONS

Hidano et al., "On biometric encryption using fingerprint and its security evaluation," Control, Automation, Robotics and Vision, 2008. ICARCV 2008. 10th International Conference on Year: 2008 pp. 950-956.*

(Continued)

*Primary Examiner* — Roderick Tolentino
(74) *Attorney, Agent, or Firm* — Kevin McDermott, Esq.

(57) ABSTRACT

A method of authenticating users to reduce transaction risks includes indicating a desire to conduct a transaction and determining whether the transaction requires access to protected resources. Moreover, the method determines whether inputted information is known, determines a state of a communications device when the inputted information is known, and transmits a biometric authentication request from a server to an authentication system when the state of the communications device is enrolled. Additionally, the method includes validating the communications device, capturing biometric authentication data in accordance with a biometric authentication data capture request with the communications device, biometrically authenticating the user, generating a one-time pass-phrase and storing the one-time pass-phrase on the authentication system when the user is authenticated, comparing the transmitted one-time pass-phrase against the stored one-time pass-phrase, and granting access to the protected resources when the transmitted and stored one-time pass-phrases match.

18 Claims, 8 Drawing Sheets

(51) Int. Cl.
*G06F 21/32* (2013.01)
*G06F 21/57* (2013.01)
*G06Q 10/00* (2012.01)
*G06Q 30/06* (2012.01)
*H04L 9/32* (2006.01)
*G06F 21/31* (2013.01)
*G06Q 20/40* (2012.01)

(52) U.S. Cl.
CPC ............ *G06F 21/577* (2013.01); *G06Q 10/00* (2013.01); *G06Q 20/4016* (2013.01); *G06Q 30/06* (2013.01); *H04L 9/3228* (2013.01); *H04L 9/3231* (2013.01); *H04L 63/08* (2013.01); *H04L 63/123* (2013.01); *H04L 2209/56* (2013.01)

(56) References Cited

U.S. PATENT DOCUMENTS

| | | | |
|---|---|---|---|
| 5,615,277 A | 3/1997 | Hoffman | |
| 5,764,789 A | 6/1998 | Pare, Jr. et al. | |
| 5,802,199 A | 9/1998 | Pare, Jr. et al. | |
| 5,805,719 A | 9/1998 | Pare, Jr. et al. | |
| 5,838,812 A | 11/1998 | Pare, Jr. et al. | |
| 5,870,723 A | 2/1999 | Pare, Jr. et al. | |
| 5,982,914 A | 11/1999 | Lee et al. | |
| 5,999,808 A | 12/1999 | LaDue | |
| 6,012,039 A | 1/2000 | Hoffman et al. | |
| 6,016,476 A | 1/2000 | Maes et al. | |
| 6,058,480 A * | 5/2000 | Brown | G06F 21/31 726/6 |
| 6,148,404 A * | 11/2000 | Yatsukawa | G06F 21/335 380/30 |
| 6,154,879 A | 11/2000 | Pare, Jr. et al. | |
| 6,192,142 B1 | 2/2001 | Pare, Jr. et al. | |
| 6,230,148 B1 | 5/2001 | Pare, Jr. et al. | |
| 6,234,900 B1 | 5/2001 | Cumbers | |
| 6,269,348 B1 | 7/2001 | Pare, Jr. et al. | |
| 6,282,648 B1 | 8/2001 | Walker et al. | |
| 6,366,682 B1 | 4/2002 | Hoffman et al. | |
| 6,397,198 B1 | 5/2002 | Hoffman et al. | |
| 6,411,728 B1 | 6/2002 | Lee et al. | |
| 6,508,709 B1 | 1/2003 | Karmarkar | |
| 6,581,042 B2 | 6/2003 | Pare, Jr. et al. | |
| 6,591,002 B2 | 7/2003 | Lee et al. | |
| 6,594,376 B2 | 7/2003 | Hoffman et al. | |
| 6,636,973 B1 | 10/2003 | Novoa et al. | |
| 6,662,166 B2 | 12/2003 | Pare, Jr. et al. | |
| 6,678,733 B1 * | 1/2004 | Brown | H04L 63/0209 709/203 |
| 6,694,436 B1 | 2/2004 | Audebert | |
| 6,778,820 B2 | 8/2004 | Tendler | |
| 6,783,459 B2 | 8/2004 | Cumbers | |
| 6,846,238 B2 | 1/2005 | Wells | |
| 6,879,966 B1 | 4/2005 | Lapsley et al. | |
| 6,892,938 B2 | 5/2005 | Solomon | |
| 6,920,435 B2 | 7/2005 | Hoffman et al. | |
| 6,934,858 B2 | 8/2005 | Woodhill | |
| 6,945,870 B2 | 9/2005 | Gatto et al. | |
| 6,950,810 B2 | 9/2005 | Lapsley et al. | |
| 6,979,264 B2 | 12/2005 | Chatigny et al. | |
| 6,980,670 B1 | 12/2005 | Hoffman et al. | |
| 6,984,175 B2 | 1/2006 | Nguyen et al. | |
| 6,985,608 B2 | 1/2006 | Hoffman et al. | |
| 7,004,389 B1 | 2/2006 | Robinson et al. | |
| 7,020,308 B1 * | 3/2006 | Shinzaki | G06F 21/32 340/5.53 |
| 7,054,811 B2 | 5/2006 | Barzilay | |
| 7,073,067 B2 | 7/2006 | Mizrah | |
| 7,082,415 B1 | 7/2006 | Robinson et al. | |
| 7,107,245 B1 | 9/2006 | Kowalick | |
| 7,114,080 B2 | 9/2006 | Rahman et al. | |
| 7,130,452 B2 | 10/2006 | Bolle et al. | |
| 7,152,045 B2 | 12/2006 | Hoffman | |
| 7,155,416 B2 | 12/2006 | Shatford | |
| 7,161,465 B2 | 1/2007 | Wood et al. | |
| 7,175,528 B1 | 2/2007 | Cumbers | |
| 7,178,025 B2 * | 2/2007 | Scheidt | G06F 21/31 705/67 |
| 7,185,807 B1 | 3/2007 | Robinson et al. | |
| 7,188,314 B2 | 3/2007 | Mizrah | |
| 7,209,903 B1 | 4/2007 | Mamdani et al. | |
| RE39,644 E | 5/2007 | Alcorn et al. | |
| 7,222,101 B2 | 5/2007 | Bishop et al. | |
| 7,225,156 B2 | 5/2007 | Fisher et al. | |
| 7,246,244 B2 | 7/2007 | Nanavati et al. | |
| 7,248,719 B2 | 7/2007 | Hoffman et al. | |
| 7,269,737 B2 | 9/2007 | Robinson | |
| 7,287,689 B2 | 10/2007 | Tidwell et al. | |
| 7,288,025 B1 | 10/2007 | Cumbers | |
| 7,297,062 B2 | 11/2007 | Gatto et al. | |
| 7,319,987 B1 | 1/2008 | Hoffman et al. | |
| 7,340,058 B2 | 3/2008 | Jakobsson et al. | |
| 7,356,705 B2 | 4/2008 | Ting | |
| 7,366,702 B2 | 4/2008 | David | |
| 7,367,049 B1 | 4/2008 | Robinson et al. | |
| 7,389,269 B1 | 6/2008 | Robinson et al. | |
| 7,391,301 B2 | 6/2008 | Seike et al. | |
| 7,398,918 B1 | 7/2008 | Schwartz, Jr. | |
| 7,398,925 B2 | 7/2008 | Tidwell et al. | |
| 7,409,543 B1 | 8/2008 | Bjorn | |
| 7,428,411 B2 | 9/2008 | Zellner | |
| 7,437,147 B1 | 10/2008 | Luciano, Jr. | |
| 7,437,330 B1 | 10/2008 | Robinson et al. | |
| 7,441,263 B1 | 10/2008 | Bakshi et al. | |
| 7,444,507 B2 | 10/2008 | Mak et al. | |
| 7,464,059 B1 | 12/2008 | Robinson et al. | |
| 7,472,425 B2 | 12/2008 | Suzuki et al. | |
| 7,483,862 B1 | 1/2009 | Robinson et al. | |
| 7,487,538 B2 | 2/2009 | Mok | |
| 7,496,964 B2 | 2/2009 | Renfro et al. | |
| 7,497,372 B1 | 3/2009 | Robinson et al. | |
| 7,502,761 B2 | 3/2009 | Siegal et al. | |
| 7,512,567 B2 | 3/2009 | Bemmel et al. | |
| 7,530,110 B2 | 5/2009 | Cheng et al. | |
| 7,530,113 B2 | 5/2009 | Braun | |
| 7,533,066 B1 | 5/2009 | Robinson et al. | |
| 7,533,809 B1 | 5/2009 | Robinson et al. | |
| 7,535,344 B2 | 5/2009 | Obradovich | |
| 7,536,352 B2 | 5/2009 | Lapsley et al. | |
| 7,542,590 B1 | 6/2009 | Robinson et al. | |
| 7,549,576 B2 | 6/2009 | Alderucci et al. | |
| 7,552,340 B2 | 6/2009 | Ooi et al. | |
| 7,552,467 B2 | 6/2009 | Lindsay | |
| 7,558,406 B1 | 7/2009 | Robinson et al. | |
| 7,558,407 B2 | 7/2009 | Hoffman et al. | |
| 7,562,814 B1 | 7/2009 | Shao et al. | |
| 7,565,329 B2 | 7/2009 | Lapsley et al. | |
| 7,574,733 B2 | 8/2009 | Woodhill | |
| 7,577,847 B2 | 8/2009 | Nguyen et al. | |
| 7,606,401 B2 | 10/2009 | Hoffman et al. | |
| 7,613,659 B1 | 11/2009 | Hoffman et al. | |
| 7,620,605 B2 | 11/2009 | Hoffman et al. | |
| 7,623,659 B2 | 11/2009 | Huang et al. | |
| 7,624,073 B1 | 11/2009 | Robinson et al. | |
| 7,631,193 B1 | 12/2009 | Hoffman | |
| 7,644,861 B2 | 1/2010 | Alderucci et al. | |
| 7,685,629 B1 | 3/2010 | White et al. | |
| 7,698,567 B2 | 4/2010 | Hoffman | |
| 7,699,703 B2 | 4/2010 | Muir et al. | |
| 7,747,528 B1 | 6/2010 | Robinson et al. | |
| 7,765,164 B1 | 7/2010 | Robinson et al. | |
| 7,769,695 B2 | 8/2010 | Robinson et al. | |
| 7,775,879 B2 | 8/2010 | Walker et al. | |
| 7,778,933 B2 | 8/2010 | Robinson et al. | |
| 7,792,297 B1 | 9/2010 | Piccionelli et al. | |
| 7,828,652 B2 | 11/2010 | Nguyen et al. | |
| 7,865,937 B1 | 1/2011 | White et al. | |
| 7,870,599 B2 | 1/2011 | Pemmaraju | |
| 7,871,329 B2 | 1/2011 | Rowe | |
| 7,877,798 B2 | 1/2011 | Saunders et al. | |
| 7,882,032 B1 | 2/2011 | Hoffman | |
| 7,886,156 B2 | 2/2011 | Franchi | |
| 7,930,345 B2 | 4/2011 | Dhupelia et al. | |

(56) References Cited

U.S. PATENT DOCUMENTS

| | | |
|---|---|---|
| 7,979,177 B2 | 7/2011 | Hermann et al. |
| 7,979,740 B2 | 7/2011 | Taylor et al. |
| 7,991,388 B1 | 8/2011 | Becker et al. |
| 8,000,894 B2 | 8/2011 | Taylor et al. |
| 8,015,118 B1 | 9/2011 | Robinson et al. |
| 8,015,595 B2 | 9/2011 | Benbrahim |
| 8,028,896 B2 | 10/2011 | Carter et al. |
| 8,070,604 B2 | 12/2011 | Amaitis et al. |
| 8,078,885 B2 | 12/2011 | Jobmann |
| 8,092,303 B2 | 1/2012 | Amaitis et al. |
| 8,123,616 B2 | 2/2012 | Wells et al. |
| 8,157,642 B2 | 4/2012 | Paulsen |
| 8,162,756 B2 | 4/2012 | Amaitis et al. |
| 8,200,980 B1 | 6/2012 | Robinson et al. |
| 8,201,229 B2 | 6/2012 | Ruppert et al. |
| 8,244,216 B1 | 8/2012 | Becker et al. |
| 8,443,202 B2 | 5/2013 | White et al. |
| 8,499,342 B1 | 7/2013 | Macwan |
| 8,522,320 B2 | 8/2013 | Kleve et al. |
| 8,542,879 B1 | 9/2013 | Nechyba et al. |
| 8,660,709 B2 | 2/2014 | Harvey et al. |
| 8,761,998 B2 | 6/2014 | Chen et al. |
| 8,798,336 B2 | 8/2014 | Nechyba et al. |
| 8,818,647 B2 | 8/2014 | Breed |
| 8,831,794 B2 | 9/2014 | Persaud et al. |
| 8,849,519 B2 | 9/2014 | Westra et al. |
| 8,855,575 B2 | 10/2014 | Heines et al. |
| 8,856,541 B1 | 10/2014 | Chaudhury et al. |
| 8,874,301 B1 | 10/2014 | Rao et al. |
| 8,880,239 B2 | 11/2014 | Kleve et al. |
| 8,918,231 B2 | 12/2014 | Rovik |
| 8,937,528 B2 | 1/2015 | Protopapas |
| 8,958,955 B2 | 2/2015 | Hotary et al. |
| 9,002,586 B2 | 4/2015 | Feit |
| 9,002,596 B2 | 4/2015 | Morris |
| 9,008,854 B2 | 4/2015 | Breed |
| 9,064,101 B2 | 6/2015 | Kleve et al. |
| 9,117,109 B2 | 8/2015 | Nechyba et al. |
| 9,162,648 B1 | 10/2015 | Weng et al. |
| 9,242,619 B2 | 1/2016 | Choi |
| 2001/0027527 A1 | 10/2001 | Khidekel et al. |
| 2001/0034237 A1 | 10/2001 | Garahi |
| 2002/0026427 A1 | 2/2002 | Kon et al. |
| 2002/0073213 A1* | 6/2002 | Mekata .......... G06F 21/32 709/229 |
| 2002/0115444 A1 | 8/2002 | Yu et al. |
| 2002/0124064 A1 | 9/2002 | Epstein et al. |
| 2002/0188842 A1 | 12/2002 | Willeby |
| 2003/0005290 A1 | 1/2003 | Fishman et al. |
| 2003/0036425 A1 | 2/2003 | Kaminkow et al. |
| 2003/0046587 A1 | 3/2003 | Bheemarasetti et al. |
| 2003/0131265 A1 | 7/2003 | Bhakta |
| 2003/0135740 A1 | 7/2003 | Talmor et al. |
| 2003/0139190 A1 | 7/2003 | Steelberg et al. |
| 2003/0159066 A1 | 8/2003 | Staw et al. |
| 2003/0163739 A1 | 8/2003 | Armington et al. |
| 2004/0059682 A1 | 3/2004 | Hasumi et al. |
| 2004/0097217 A1 | 5/2004 | McClain |
| 2004/0143515 A1 | 7/2004 | Kawasaki |
| 2004/0148526 A1 | 7/2004 | Sands et al. |
| 2004/0243848 A1 | 12/2004 | Blackburn et al. |
| 2004/0250085 A1 | 12/2004 | Tattan et al. |
| 2004/0254890 A1 | 12/2004 | Sancho et al. |
| 2005/0005127 A1 | 1/2005 | Rowe et al. |
| 2005/0096906 A1 | 5/2005 | Barzilay |
| 2005/0097320 A1* | 5/2005 | Golan .......... G06F 21/40 713/166 |
| 2005/0193198 A1 | 9/2005 | Livowsky |
| 2005/0273442 A1 | 12/2005 | Bennett et al. |
| 2006/0038655 A1 | 2/2006 | Hauke |
| 2006/0041755 A1 | 2/2006 | Pemmaraju |
| 2006/0053296 A1 | 3/2006 | Busboom et al. |
| 2006/0064588 A1 | 3/2006 | Tidwell et al. |
| 2006/0068904 A1 | 3/2006 | Nguyen et al. |
| 2006/0080547 A1* | 4/2006 | Higashiura .......... G06F 21/32 713/186 |
| 2006/0102717 A1 | 5/2006 | Wood et al. |
| 2006/0106734 A1 | 5/2006 | Hoffman et al. |
| 2006/0136739 A1 | 6/2006 | Brock et al. |
| 2006/0179304 A1 | 8/2006 | Han |
| 2006/0190455 A1 | 8/2006 | Braddy et al. |
| 2006/0230438 A1 | 10/2006 | Shappir et al. |
| 2006/0265602 A1 | 11/2006 | Robinson |
| 2006/0282660 A1 | 12/2006 | Varghese et al. |
| 2006/0288234 A1 | 12/2006 | Azar et al. |
| 2006/0293891 A1 | 12/2006 | Pathuel |
| 2007/0008924 A1 | 1/2007 | Moran |
| 2007/0016941 A1 | 1/2007 | Gonzalez et al. |
| 2007/0055517 A1 | 3/2007 | Spector |
| 2007/0079135 A1 | 4/2007 | Saito |
| 2007/0098235 A1 | 5/2007 | Halavee et al. |
| 2007/0113294 A1 | 5/2007 | Field et al. |
| 2007/0124599 A1 | 5/2007 | Morita et al. |
| 2007/0133843 A1 | 6/2007 | Nakatani |
| 2007/0143827 A1 | 6/2007 | Nicodemus et al. |
| 2007/0150965 A1 | 6/2007 | Redlich et al. |
| 2007/0155489 A1 | 7/2007 | Beckley et al. |
| 2007/0156436 A1 | 7/2007 | Fisher et al. |
| 2007/0162337 A1 | 7/2007 | Hawkins et al. |
| 2007/0169182 A1 | 7/2007 | Wolfond et al. |
| 2007/0180493 A1 | 8/2007 | Croft et al. |
| 2007/0202941 A1 | 8/2007 | Miltenberger et al. |
| 2007/0220596 A1 | 9/2007 | Keeler et al. |
| 2007/0250920 A1 | 10/2007 | Lindsay |
| 2007/0255841 A1 | 11/2007 | Chong |
| 2007/0265745 A1 | 11/2007 | Styles et al. |
| 2007/0282677 A1 | 12/2007 | Carpenter |
| 2007/0288319 A1 | 12/2007 | Robinson et al. |
| 2007/0288320 A1 | 12/2007 | Cooper et al. |
| 2007/0288759 A1* | 12/2007 | Wood .......... G06Q 20/341 713/186 |
| 2007/0295807 A1 | 12/2007 | Antos et al. |
| 2007/0298887 A1 | 12/2007 | Ryan |
| 2008/0020788 A1 | 1/2008 | Griswold et al. |
| 2008/0021787 A1 | 1/2008 | Mackouse |
| 2008/0034221 A1 | 2/2008 | Hammad et al. |
| 2008/0066165 A1 | 3/2008 | Rosenoer |
| 2008/0072295 A1 | 3/2008 | Borenstein et al. |
| 2008/0086759 A1 | 4/2008 | Colson |
| 2008/0097851 A1 | 4/2008 | Bemmel et al. |
| 2008/0098464 A1 | 4/2008 | Mizrah |
| 2008/0102956 A1 | 5/2008 | Burman et al. |
| 2008/0147481 A1 | 6/2008 | Robinson et al. |
| 2008/0150677 A1 | 6/2008 | Arakawa |
| 2008/0172730 A1 | 7/2008 | Sandhu et al. |
| 2008/0229400 A1* | 9/2008 | Burke .......... G06F 21/32 726/7 |
| 2008/0233946 A1 | 9/2008 | Henry |
| 2008/0235771 A1 | 9/2008 | Corley et al. |
| 2008/0244712 A1 | 10/2008 | Kitada et al. |
| 2008/0244720 A1 | 10/2008 | Bartsch et al. |
| 2008/0249947 A1 | 10/2008 | Potter |
| 2008/0271116 A1 | 10/2008 | Robinson et al. |
| 2008/0275821 A1 | 11/2008 | Bishop et al. |
| 2008/0287188 A1 | 11/2008 | Riera Jorba et al. |
| 2008/0313719 A1 | 12/2008 | Kaliski, Jr. et al. |
| 2008/0313726 A1 | 12/2008 | Gardner |
| 2009/0074256 A1 | 3/2009 | Haddad |
| 2009/0083847 A1 | 3/2009 | Fadell et al. |
| 2009/0083850 A1 | 3/2009 | Fadell et al. |
| 2009/0089869 A1 | 4/2009 | Varghese |
| 2009/0097661 A1 | 4/2009 | Orsini et al. |
| 2009/0099944 A1 | 4/2009 | Robinson et al. |
| 2009/0100270 A1 | 4/2009 | Ting |
| 2009/0113205 A1 | 4/2009 | Labaton |
| 2009/0119754 A1 | 5/2009 | Schubert |
| 2009/0138366 A1 | 5/2009 | Bemmel et al. |
| 2009/0176565 A1 | 7/2009 | Kelly |
| 2009/0177587 A1 | 7/2009 | Siegal et al. |
| 2009/0191857 A1 | 7/2009 | Horn et al. |
| 2009/0205033 A1 | 8/2009 | Lapsley et al. |
| 2009/0228362 A1 | 9/2009 | Lapsley et al. |
| 2009/0249478 A1 | 10/2009 | Rosener et al. |

(56) References Cited

U.S. PATENT DOCUMENTS

| | | |
|---|---|---|
| 2009/0259848 A1 | 10/2009 | Williams et al. |
| 2009/0265768 A1 | 10/2009 | Labaton |
| 2009/0265776 A1 | 10/2009 | Baentsch et al. |
| 2009/0271635 A1 | 10/2009 | Liu et al. |
| 2009/0287837 A1 | 11/2009 | Felsher |
| 2009/0292927 A1 | 11/2009 | Wenzel et al. |
| 2009/0319798 A1 | 12/2009 | Ooi et al. |
| 2010/0031319 A1 | 2/2010 | Cohen et al. |
| 2010/0042848 A1 | 2/2010 | Rosener |
| 2010/0049659 A1 | 2/2010 | Cassone |
| 2010/0062838 A1 | 3/2010 | Nguyen et al. |
| 2010/0103035 A1 | 4/2010 | Daneri |
| 2010/0105482 A1 | 4/2010 | Pacey et al. |
| 2010/0114734 A1 | 5/2010 | Giuli et al. |
| 2010/0116884 A1 | 5/2010 | Alderucci et al. |
| 2010/0144426 A1 | 6/2010 | Winner et al. |
| 2010/0257357 A1 | 10/2010 | McClain |
| 2011/0093158 A1 | 4/2011 | Theisen et al. |
| 2011/0119754 A1 | 5/2011 | Larsen et al. |
| 2011/0151849 A9 | 6/2011 | Dupray et al. |
| 2011/0154497 A1 | 6/2011 | Bailey, Jr. |
| 2011/0269535 A1 | 11/2011 | Kelly et al. |
| 2011/0282789 A1 | 11/2011 | Carroll et al. |
| 2011/0313872 A1 | 12/2011 | Carter et al. |
| 2012/0046096 A1 | 2/2012 | Morrison et al. |
| 2012/0066507 A1 | 3/2012 | Jobmann |
| 2012/0077570 A1 | 3/2012 | Kelly et al. |
| 2012/0088571 A1 | 4/2012 | Kelly et al. |
| 2012/0088572 A1 | 4/2012 | Kelly et al. |
| 2012/0108323 A1 | 5/2012 | Kelly et al. |
| 2012/0123943 A1 | 5/2012 | Potts et al. |
| 2012/0124651 A1 | 5/2012 | Ganesan et al. |
| 2012/0184352 A1 | 7/2012 | Detlefsen et al. |
| 2012/0202574 A1 | 8/2012 | Stanek et al. |
| 2013/0040620 A1 | 2/2013 | Van Wiemeersch |
| 2013/0080789 A1 | 3/2013 | Headley |
| 2013/0099940 A1 | 4/2013 | Protopapas |
| 2013/0212655 A1 | 8/2013 | Hoyos et al. |
| 2014/0028472 A1 | 1/2014 | Protopapas |
| 2014/0039721 A1 | 2/2014 | Protopapas |
| 2014/0070917 A1 | 3/2014 | Protopapas |
| 2014/0129053 A1 | 5/2014 | Kleve et al. |
| 2014/0204211 A1 | 7/2014 | Gussen et al. |
| 2014/0240086 A1 | 8/2014 | Van Wiemeersch |
| 2014/0282931 A1 | 9/2014 | Protopapas |
| 2014/0285216 A1 | 9/2014 | Cuddihy et al. |
| 2014/0303899 A1 | 10/2014 | Fung et al. |
| 2014/0309893 A1 | 10/2014 | Ricci |
| 2014/0313333 A1 | 10/2014 | Le et al. |
| 2014/0347458 A1 | 11/2014 | Tijerina et al. |
| 2015/0066282 A1 | 3/2015 | Yopp |
| 2015/0149017 A1 | 5/2015 | Attard et al. |
| 2015/0161832 A1 | 6/2015 | Esselink et al. |
| 2015/0175070 A1 | 6/2015 | Attard et al. |
| 2015/0210287 A1 | 7/2015 | Penilla et al. |
| 2015/0217726 A1 | 8/2015 | Lee et al. |
| 2015/0246673 A1 | 9/2015 | Tseng et al. |
| 2015/0259953 A1 | 9/2015 | Linden et al. |
| 2015/0334506 A1 | 11/2015 | Rao et al. |
| 2015/0337571 A1 | 11/2015 | Henderson |
| 2015/0337587 A1 | 11/2015 | Lu et al. |
| 2015/0352979 A1 | 12/2015 | O'Bannon et al. |
| 2016/0031506 A1 | 2/2016 | Lloyd et al. |
| 2016/0031516 A1 | 2/2016 | Southey et al. |

FOREIGN PATENT DOCUMENTS

| | | |
|---|---|---|
| JP | 2006-155628 | 6/2006 |
| JP | 2008-129647 | 6/2008 |
| WO | WO 96/36934 | 11/1996 |
| WO | WO 00/45247 | 8/2000 |
| WO | WO 00/45320 | 8/2000 |
| WO | WO 00/46710 | 8/2000 |
| WO | WO 00/67187 | 11/2000 |
| WO | WO 01/06440 | 1/2001 |
| WO | WO 01/20531 | 3/2001 |
| WO | WO 03/062969 A1 | 7/2003 |
| WO | WO 2004/003689 | 1/2004 |
| WO | WO 2005/025292 A2 | 3/2005 |
| WO | WO 2005/025292 A3 | 3/2005 |
| WO | WO 2006/055887 | 5/2006 |
| WO | WO 2007/079595 A1 | 7/2007 |
| WO | WO 2007/092715 | 8/2007 |
| WO | WO 2008/002979 | 1/2008 |
| WO | WO 2008/048948 | 4/2008 |

OTHER PUBLICATIONS

Scheirer et al. "Cracking Fuzzy Vaults and Biometric Encryption," Biometrics Symposium, 2007 Year: 2007 pp. 1-6.*

Bolton, Joshua B., E-Authentication Guidance for Federal Agencies, Office of Management and Budget, Washington, DC, Dec. 16, 2003, 17 pages.

Miller, Alison, Risks in Biometric-based Authentication Schemes, Global Information Assurance Certification Paper, Mar. 29, 2000, 6 pages.

Extended European Search Report from EPO Application No. 11157870.4, mailed on Aug. 3, 2011, pp. 1-5.

Extended European Search Report from EPO Application No. 09172150.6, mailed on Dec. 3, 2009.

https://vipmobile.verisign.com/selectphonemodel.v—Printed pages of Verisign Identity Protection Mobile Center web site. There is also a video about VIP Access at the site.

Min et al., "A secure one-time password authentication scheme with low-computation for mobile communications", ACM SIGOPS Operating Systems Review,vol. 38, Issue 2 pp. 76-84.

Song et al. "An Identity-Based One-Time Password Scheme with Anonymous Authentication" NSWCTC, Wireless Communications and Trusted Computing—pp. 864-867, 2008.

Jongpil et al., "Integrated OTP-Based User Authentication Scheme Using Smart Cards in Home Networks", IEEE Computer Society, p. 294, 2008.

ByungRae et al., "Password Generation of OTP System using Fingerprint Features", IEEE Computer Society, pp. 243-247, 2008.

Aloul et al. "Two factor authentication using mobile phones", Department of Computer Science & Engineering, Computer Systems and Applications, pp. 641-644, 2009.

ByungeRae et al. "Design and Efficiency Analysis of New OTP System Using Homomorphic Graph of Fingerprint Features" Convergence and Hybrid Info. Tech., vol. 2, 585-590 2008.

ByungRay et al., "Random password generation of OTP system using changed location and angle of fingerprint features" Computer and Info. Tech., pp. 420-425, Jul. 2008.

Strikeforce—Specializing in Preventing Identity Theft. Five (5) screen shots from Strikeforce website.

An Examination report from EPO Application No. 11157870.4, mailed on Jan. 20, 2015, pp. 1-5.

* cited by examiner

60 ─▶

62 — TRANSACTION | 64 — LEVEL OF RISK

| TRANSACTION | LEVEL OF RISK |
|---|---|
| REGIONAL OFFICES | LOWEST |
| ACTIVE ACCOUNTS | LOWEST |
| ACCOUNT BALANCES | LOW |
| WITHDRAW FUNDS | HIGH |
| TRANSFER FUNDS | HIGH |
| CLOSE ACCOUNT | HIGHEST |

| LEVEL OF RISK (64) | BIOMETRIC DATA REQUIREMENT (68) |
|---|---|
| LOWEST | NONE |
| LOW | VOICE |
| HIGH | FACE AND IRIS |
| HIGHEST | VOICE, FACE AND IRIS |

| RISK FACTOR (72) | LEVEL OF RISK ADJUSTMENT (74) |
|---|---|
| Time of Day | Increase Level of Risk |
| Less than or Equal to Distance from Home | Decrease Level of Risk |
| Greater than Distance from Home Address | Increase Level of Risk |
| Duration since Previous Authentication | Increase Level of Risk |

FIG. 6

METHODS AND SYSTEMS FOR AUTHENTICATING USERS

CROSS-REFERENCE TO RELATED APPLICATIONS

This is a continuation application of U.S. patent application Ser. No. 14/922,310, filed Oct. 26, 2015, which is a continuation application of U.S. patent application Ser. No. 13/845,444, filed Mar. 18, 2013, now U.S. Pat. No. 9,202,028, issued Dec. 1, 2015, which is a continuation application of U.S. patent application Ser. No. 12/535,720, filed Aug. 5, 2009, now U.S. Pat. No. 8,443,202, issued May 14, 2013, the disclosures of which are incorporated herein by reference.

BACKGROUND OF THE INVENTION

This invention relates generally to methods and systems for authenticating users over networks, and more particularly, to methods and systems of authenticating users over networks that increase the security of protected resources accessible over networks to thus reduce network-based transaction risks.

Websites are generally established by entities on networks such that users are able to navigate to the web sites to conduct site appropriate network-based transactions. As long as user passwords required to access websites remain secret, such network-based transactions may be safely conducted without compromising the security of data that is accessible through the website. However, risks that such network-based transactions may be conducted fraudulently have increased due to password misuse, such as password sharing with untrustworthy third parties, and due to sophisticated techniques, such as phishing, developed by third parties to surreptitiously obtain user passwords. By obtaining user passwords, third parties are able to obtain information about individual users, and entities such as financial institutions, hospitals and national militaries. Such information may include social security numbers, credit card numbers, bank account numbers, private patient medical records and sensitive national military secrets. Third parties may use such information to conduct fraudulent network-based transactions with financial institutions, blackmail patients to keep medical records confidential, and to anticipate and counter national military strategies.

Known authentication techniques that typically require users to enter the same unique username and the same unique password each time the web site is accessed may not adequately protect against fraudulently conducting network-based transactions and fraudulently accessing network accessible data, and thus may expose users and entities to increased network-based transactional risks. Consequently, it has been known to supplement such known authentication techniques with other authentication techniques by installing additional identification information on software or hardware tokens. However, generating the tokens themselves, constructing enrollment sites and systems for collecting enrollment information from users, procuring software and hardware to support token use, and maintaining such software and hardware systems is complex, expensive and time consuming.

BRIEF DESCRIPTION OF THE INVENTION

In one aspect, a method of authenticating users to reduce transaction risks is provided. The method includes storing biometric authentication data and personal data for each of a plurality of authorized users in an authentication system, and storing protected resources in a server, wherein each of the protected resources is associated with a corresponding one of the plurality of authorized users. The authentication system is different than the server, and the server is included in a first communications channel. The method also includes indicating a desire to conduct at least one transaction, determining whether the at least one transaction requires access to the protected resources, and when the at least one transaction requires access to protected resources inputting information in a workstation such that a workstation user performs the indicating and inputting operations at the workstation.

Moreover, the method includes determining whether the inputted information is known, determining a state of a communications device when the inputted information is known, and transmitting a biometric authentication request from the server over the first communications channel to the authentication system when the state of the communications device is enrolled. The biometric authentication request includes a biometric authentication data requirement. Furthermore, the method includes generating a biometric authentication data capture request in response to the authentication request, and transmitting the biometric authentication data capture request over a second communications channel from the authentication system to the communications device. The communications device is included in the second channel and is associated with one of the plurality of authorized users and the one authorized user is associated with the inputted information. Additionally, the method includes validating the communications device, verifying that the at least one transaction is pending, obtaining the biometric authentication data capture request transmission, capturing biometric authentication data in accordance with the biometric authentication data capture request from the workstation user with the communications device, and transmitting the captured biometric authentication data from the communications device to the authentication system over the second communications channel.

The method also includes comparing the captured biometric authentication data against biometric authentication data of the one authorized user stored in the authentication system, generating a one-time pass-phrase, storing the one-time pass-phrase on the authentication system and transmitting the one-time pass-phrase to the communications device over the second communications channel when the workstation user is authenticated as the one authorized user. Next the method continues by obtaining the one-time pass-phrase from the communications device and entering the one-time pass-phrase into the workstation, transmitting the one-time pass-phrase from the workstation to the authentication system over the first communications channel, comparing the transmitted one-time pass-phrase against the stored one-time pass-phrase, and granting access to the protected resources of the one authorized user when the transmitted and stored one-time pass-phrases match.

In another aspect, a system for authenticating users that reduces transaction risks is provided. The system includes a computer configured as a server that includes at least a database. The server is configured to store within the database a first configurable policy, to determine whether at least one transaction requires access to protected resources when a workstation user indicates a desire to conduct the at least one transaction, to receive information inputted by the workstation user in the workstation, to determine whether the inputted information is known, and to determine a level of risk associated with the at least one transaction.

The system also includes at least one workstation, including at least a workstation computer operationally coupled to the server, configured to receive information input by the workstation user. The at least one workstation, the server and the network comprise a first communications channel. Moreover, the system includes an authentication system including an authentication database. The authentication system is configured to communicate with the server, to store within the authentication database biometric authentication data and personal data associated with each of a plurality of authorized users, to store an authentication policy, to verify that the at least one transaction is pending, and to initiate a biometric authentication process over a second communications channel in response to a communication from the first communications channel.

Moreover, the system includes a communications device included in the second channel. The communications device is associated with one of the plurality of authorized users and is configured to communicate with the authentication system over the second communications channel, to receive a biometric authentication data request transmitted over the second communications channel from the authentication system, to capture biometric authentication data in accordance with the biometric authentication request from the workstation user and transmit the captured biometric data to the authentication system over the second communications channel. It should be appreciated that the one authorized user is associated with information inputted by the workstation user.

The authentication system is further configured to validate the communications device, to determine a state of the communications device when the inputted information is known, to transmit a biometric authentication data request corresponding to a level of risk of the at least one transaction, to compare the captured biometric data against biometric authentication data of the one authorized user, and generate and transmit a one-time pass-phrase over the second communications channel when the workstation user is authenticated as the one authorized user.

It should be understood that the communications device is further configured to display the at least one transaction, and to receive and display the one-time pass-phrase such that the one-time pass-phrase can be inputted into the workstation and transmitted over the first communications channel to the authentication system. The authentication system is further configured to compare the one-time pass-phrase transmitted from the authentication system against the one-time pass-phrase received by the authentication system. Moreover, the server is configured to grant access to the protected resources of the one authorized user when the one-time pass-phrase transmitted from the authentication system matches the one-time pass-phrase received by the authentication system.

In yet another aspect, a method of authenticating users to reduce transaction risks is provided. The method includes storing biometric authentication data and personal data for each of a plurality of authorized users in an authentication system, and storing protected resources in a server. Each of the protected resources is associated with a corresponding one of the plurality of authorized users, the authentication system is different than the server, and the server is included in a first communications channel. Moreover, the method includes indicating a desire to conduct at least one transaction, determining whether the at least one transaction requires access to the protected resources and when the at least one transaction requires access to protected resources, inputting information at a workstation. It should be appreciated that a workstation user performs the indicating and inputting operations at the workstation.

Furthermore, it should be understood that the method includes determining whether the inputted information is known and determining a state of a communications device when the inputted information is known, determining a level of risk for the at least one transaction and transmitting a biometric authentication request from the server over the first communications channel to the authentication system when the state of the communications device is enrolled.

It should be appreciated that the method includes determining an authentication capture level corresponding to a biometric authentication data requirement for the at least one transaction, and transmitting a biometric authentication data capture request to the communications device. The biometric authentication data capture request includes at least the biometric authentication capture level. The method also includes invoking a capture level security application in the communications device and inputting the authentication capture level in the communications device such that the communications device displays the biometric authentication data requirement for the at least one transaction.

Moreover, the method includes validating the communications device and verifying that the communications device is enrolled, capturing the requested biometric authentication data from the workstation user with the communications device, and transmitting the captured biometric authentication data from the communications device to the authentication system over the second communications channel, when the at least one transaction is pending. Furthermore, the method includes comparing the captured biometric authentication data against biometric authentication data of the one authorized user stored in the authentication system, and granting access to the protected resources of the one authorized user when the captured biometric data and the biometric authentication data of the one authorized user match.

BRIEF DESCRIPTION OF THE DRAWINGS

FIG. 4 is a diagram illustrating a first exemplary configurable policy relating network-based transactions to levels of risk;

FIG. 5 is a diagram illustrating an exemplary authentication policy associating the levels of risk illustrated in FIG. 4 to biometric authentication data requirements;

FIG. 6 is a diagram illustrating exemplary risk factors and related level of risk adjustments;

DETAILED DESCRIPTION OF THE INVENTION

Figure 1:
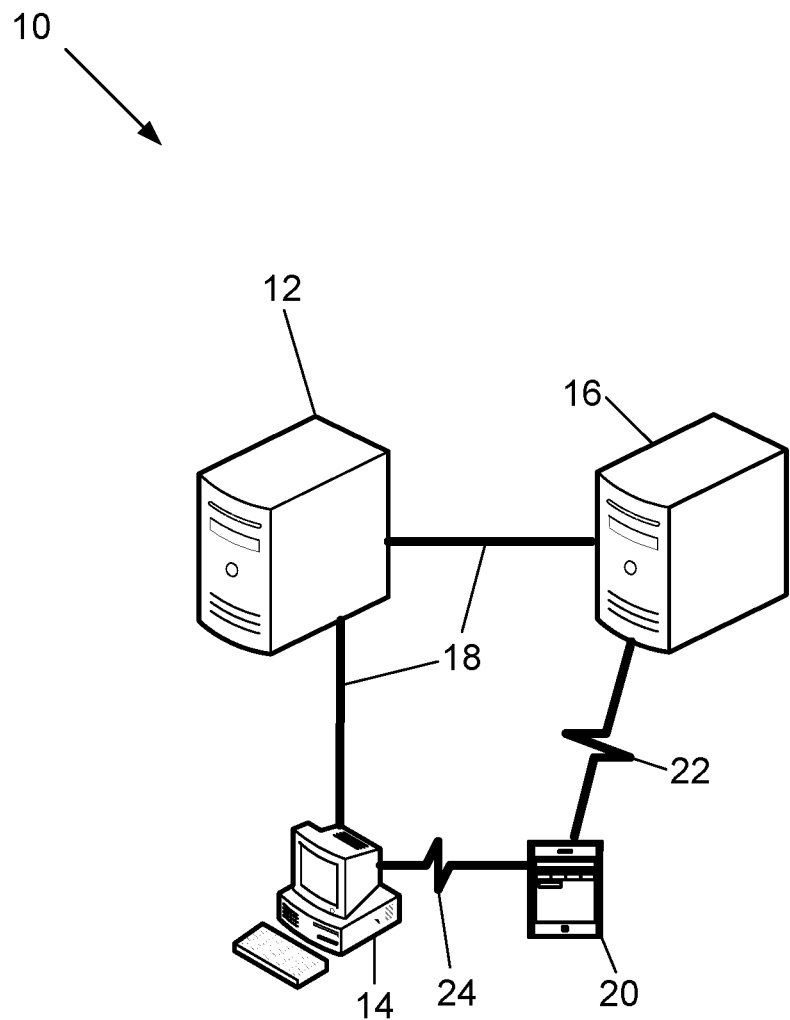
FIG. 1 is a block diagram of an exemplary embodiment of an Authentication Computer (AC) System for reducing network-based transaction risks.

FIG. 1 is an expanded block diagram of an exemplary embodiment of a system architecture of an Authentication Computer (AC) System 10 for authenticating the identity of a user to increase security of protected resources and thereby reduce network-based transaction risks. More specifically, the AC system 10 includes a server system 12, at least one workstation 14, a Biometric Authentication Computer (BAC) System 16 and a portable communications device 20.

In the exemplary embodiment, the server system 12 includes components such as, but not limited to, a web server, a database server, an application server, a directory server and a disk storage unit arranged to be combined in a single structure. The disk storage unit may be used to store any kind of data. Although these components are combined to form a single structure in the form of the server system 12 in the exemplary embodiment, it should be appreciated that in other embodiments these components may be separately positioned at different locations and operatively coupled together in a network such as, but not limited to, a local area network (LAN), a wide area network (WAN) and the Internet. The server system 12 is typically configured to be communicatively coupled to end users at the workstation 14, and to be communicatively coupled to the BAC system 16 using a communications network 18 such as, but not limited to, a LAN, a WAN and the Internet. Moreover, the network 18 may include any combination of a LAN, a WAN and the Internet. It should be understood that any authorized workstation end user at the workstation 14 can access the server system 12. In the exemplary embodiment, the server system 12 is a computer system of a financial institution service provider used to store and manage financial data for a plurality of authorized users, and to protect access to the financial data. Although the financial business is the example business described herein, the invention is in no way limited to the financial business. Thus, it should be appreciated that in other embodiments, the server system 12 may be any computer system associated with any commercial entity service provider or governmental entity service provider that stores confidential information and data generally corresponding to the business or everyday operations of the commercial or governmental entity service provider, and that controls access to the confidential information and data. Although the exemplary embodiment is described as including one server system 12 corresponding to a financial institution service provider, it should be appreciated that in other embodiments a plurality of server systems 12 may be provided such that each of the plurality of server systems 12 is associated with a different service provider.

It should be understood that the server system 12 is configured to store therein a different unique user identifier for each authorized user such that each unique user identifier is associated with the financial data of a respective authorized user. Moreover, it should be appreciated that when a plurality of server systems 12 are provided, each server system 12 associates a different unique user identifier with each authorized user having data stored therein, and that different server systems 12 associate different unique user identifiers with a same authorized user. It should also be appreciated that the different server systems 12 may be associated with service providers such as, but not limited to, hospitals, governmental agencies and educational institutions. Thus, for example, a same authorized user associated with a hospital service provider and an educational institutional service provider will have a unique user identifier for the hospital that is different from the unique user identifier for the educational institutional.

Moreover, the server system 12 includes a configurable policy that identifies a level of risk for each of a plurality of different types of network-based transactions. Furthermore, the server system 12 is configured to generate and transmit authentication requests when a workstation end user attempts to conduct network-based transactions. The authentication requests are transmitted to the BAC system 16 and include at least a request that the BAC system 16 authenticate the identity of a workstation end user attempting to conduct a network-based transaction, prior to conducting the transaction.

Protected resources include any kind of resource or data that is protected against access by unauthorized users. Such data includes, but is not limited to, confidential financial and health data records, data inherent in an e-mail, data stored in an electronic file system, and data inherent in any kind of electronic communications. Consequently, because the data stored in the server system 12 is protected against access by unauthorized users, the data stored in the server system 12 is a protected resource. It should be understood that each protected resource stored in system 12 is associated with at least a corresponding one of the plurality of authorized users.

In the exemplary embodiment, the BAC system 16 includes components such as, but not limited to, a web server, a disk storage device, a database management server and an authentication server arranged to be combined into a single structure. Although these components are combined into a single structure in the exemplary embodiment, it should be appreciated that in other embodiments these components may be separately positioned at different locations and operatively coupled together in a network such as, but not limited to, a LAN, a WAN and the Internet. The disk storage device may be used for storing at least enrollment data records of individuals, and the database management system may be used to facilitate transferring data to and from the disk storage device. The authentication server is configured to perform matching of any feature or information associated with individuals to authenticate the identity of the individuals as described herein.

The BAC system 16 is configured to be communicatively coupled to the server system 12 over the communications network 18, and to be wirelessly communicatively coupled to the communications device 20 over a communications network 22. Moreover, the BAC system 16 is configured to facilitate reducing network-based transaction risks by authenticating identities of workstation users requesting access to the protected resources stored in the server system 12. In the exemplary embodiment, the communications network 22 is a 3G communications network. However, it should be appreciated that in other embodiments the communications network 22 may be any wireless network that facilitates authentication as described herein, such as, but not limited to, W-Fi, Global System for Mobile (GSM) and Enhanced Data for GSM Environment (EDGE). Although the BAC system 16 is communicatively coupled to a single server system 12 in the exemplary embodiment, it should be appreciated that the BAC system 16 is configured to be communicatively coupled to a plurality of server systems 12.

It should be understood that as used herein, transaction risks are risks that information required to access protected resources may be surreptitiously obtained by an unauthorized workstation user, or unauthorized entity, and used by the unauthorized user to conduct fraudulent transactions involving the protected resources. Information required to access protected resources may be any type of identifier that may be used to verify the identity of an authorized user such as, but not limited to, unique user identifiers and a pass-phrases. It should be appreciated that unique user identifiers and pass-phrases are character strings that may be any desired combination of letters, numbers, punctuation symbols and mathematical symbols.

The BAC system 16 is configured to store authentication data. In the exemplary embodiment, the authentication data is biometric data that corresponds to any biometric feature desired to be used as the basis of authenticating the identity of an individual. Thus, the BAC system 16 is configured to store biometric authentication data and is configured to use the biometric authentication data to authenticate identities of users desiring to conduct transactions that require accessing the protected resources stored in the server system 12. Using biometrics as the basis for authentication facilitates enhancing trust in the identity authentication. In order to facilitate properly authenticating identities of workstation users desiring to conduct transactions that require accessing the protected resources stored in the server system 12, the BAC system 16 stores biometric authentication data in the form of enrollment data records obtained from each of the plurality of authorized users permitted to access the protected resources stored in the server system 12.

The enrollment data records stored in the BAC system 16 also include personal data for each authorized user that is associated with the authorized user's biometric data. The BAC system 16 also includes a configurable authentication policy that assigns biometric authentication data requirements to each of the different types of network-based transactions commensurate with the identified level of risk. It should be appreciated that authorized workstation users as used herein, also refers to customers.

It should be appreciated that the BAC system 16 may include additional authentication policies which are used to determine biometric and personal data that are to be obtained from a user attempting to enroll in the BAC system 16. Moreover, the additional authentication policies may be used to determine which biometric data to obtain from a workstation user attempting to conduct a network-based transaction. Furthermore, the BAC system 16 is configured to generate and transmit biometric authentication data requests to at least the communications device 20. It should be understood that the biometric authentication data requests include biometric data, determined by the BAC system 16, that is to be captured from the workstation user attempting to conduct a network-based transaction.

In the exemplary embodiment, biometric data corresponding to any biometric feature may be collected and stored as enrollment data records in the BAC system 16. Such biometric features include, but are not limited to, face, fingerprint, iris and voice. Moreover, the biometric data may take any form such as, but not limited to, images, photographs, templates and electronic data representations. It should be understood that personal data of an authorized user is associated with the biometric data of the authorized user in the enrollment data records stored in the BAC system 16.

The term "personal data" as used herein includes any demographic information regarding an individual as well as contact information pertinent to the individual. Such demographic information includes, but is not limited to, an individual's name, age, date of birth, address, citizenship and marital status. Contact information collected in the exemplary embodiment includes devices and methods for contacting the authorized user, or customer. Specifically, in the exemplary embodiment, customers are required to designate a particular communications device used by the customer and to provide information regarding the designated communications device that facilitates validating the designated communications device as known, facilitates communicating with the authorized user and facilitates authenticating the identity of the authorized user. Such information includes, but is not limited to, a communications device identifier of the designated communications device, a telephone number associated with the designated communications device, an e-mail address that can be accessed using the designated communications device, or an identifier that facilitates sending short message service (SMS) messages to the designated communications device. The information regarding the designated communications device is stored in the BAC system 16 and may be associated with the authorized user, or customer, of the designated device in the BAC system 16. Thus, it should be appreciated that the communications device identifier may be stored in the BAC system 16 such that the communications device identifier may be associated with the unique user identifier of the authorized user. It should be appreciated that the server system 12 may also be configured to store therein the communications device identifier such that the communications device identifier may be associated with the unique identifier of the authorized user in the system 12. It should be understood that in the exemplary embodiments described herein the portable communications device 20 is the designated communications device.

Although the authentication data is described as biometric data in the exemplary embodiment, it should be appreciated that in other embodiments any other type of authentication data, or combinations of different types of authentication data, may be used that facilitates authenticating the identity of a user as described herein. Such other types of authentication data include, but are not limited to, Global Positioning System (GPS) coordinates, unique pass-phrases, a combination of biometric data with GPS coordinates, a combination of biometric data with a unique pass-phrase, and a combination of GPS coordinates with a unique pass-phrase.

GPS coordinates may be determined for any GPS enabled device used by an authorized user to communicate with the BAC system 16 and may be stored in the BAC system 16 as coordinate data. For example, GPS coordinate data may be determined for workstation 14 and stored in the BAC system 16 as home address coordinate data. A geographical area may be established relative to the home address coordinate data such that when the designated communications device is determined to be outside of the geographical area, verification of a user desiring to conduct a transaction requiring access to the protected resources stored in the server system 12 does not occur. However, when the designated communications device is determined to be within the geographical area, the identity of the user desiring to conduct the transaction may be authenticated as the authorized user having access to the protected resources required to conduct the transaction. It should be appreciated that the geographical area may be a circle, centered about the home address coordinate data, having a radius based on behavior of the authorized user. For example, an authorized user having a fifty mile one-way commute to work may have a radius corresponding to the commute distance, that is, fifty miles. However, it should be appreciated that the radius may be determined by any kind of user behavior and may be any corresponding distance. Moreover, it should be appreciated that the geographical area may have any shape and size that facilitates authenticating the identity of a user as described herein. Although the example discussed herein uses the location of the workstation 14 to determine the home address coordinate data, it should be appreciated that the home address coordinate data may be the GPS coordinate data of any device, or combination of devices.

Unique pass-phrases may also be established for each authorized user and stored in the BAC system 16 such that a user desiring to conduct a transaction that requires accessing the protected resources stored in the server system 12 provides the unique pass-phrase for authentication. Alternatively, unique pass-phrases may be collected from authorized users as personal data and stored in the BAC system 16. When the user provides the correct unique pass-phrase, the user's identity is authenticated as being that of the authorized user corresponding to the provided unique pass-phrase. Otherwise, the user is not authenticated as the authorized user and is prohibited from making the desired transaction.

In the exemplary embodiment the server system 12 and the BAC system 16 are separate systems. The server system 12 is generally an existing corporate or governmental entity service provider computer system that does not include adequate authentication capabilities. The BAC system 16 is an authentication system that is generally positioned at a different location than the server system 12 and is configured to quickly connect to, and provide adequate authentication capabilities to, the server system 12. By accessing the BAC system 16, the server system 12 is able to secure adequate authentication capabilities without purchasing hardware and software to implement authentication capabilities, and without incurring costs associated with training employees to use the hardware and software. Consequently, the BAC system 16 facilitates quickly and inexpensively retrofitting existing computer systems to provide adequate authentication. Thus, it should be appreciated that as described herein, the server system 12 and the BAC system 16 are different and are not the same device or system. Moreover, it should be appreciated that the BAC system 16 may be communicatively coupled with a plurality of other server systems 12 associated with other service providers, such as medical service providers, that conduct network-based transactions requiring rigorous biometric authentication.

The workstation 14 is configured to be communicatively coupled to server system 12 via the communications network 18 and to wirelessly communicate with at least the communications device 20 over a network 24. The workstation 14 includes devices, such as, but not limited to, a CD-ROM drive for reading data from computer-readable recording mediums, such as a compact disc-read only memory (CD-ROM), a magneto-optical disc (MOD) and a digital versatile disc (DVD). Moreover, the workstation 14 includes a display device, such as, but not limited to, a liquid crystal display (LCD), a cathode ray tube (CRT) and a color monitor. Furthermore, the workstation 14 includes a printer and input devices such as, but not limited to, a mouse (not shown), keypad (not shown), a keyboard, and a microphone (not shown). Although a single workstation 14 is described in the exemplary embodiment, it should be appreciated that any number of workstations 14 may be configured to be communicatively coupled to the server system 12 and to wirelessly communicate with at least the communications device 20. In the exemplary embodiment the network 24 operates using the Bluetooth wireless communications standard. However, in other embodiments the network 24 may operate using any wireless communications standard that facilitates authentication as described herein.

The communications device 20 is configured to wirelessly communicate with at least the BAC system 16 over the network 22 and wirelessly communicate with the workstation 14 over the network 24. Moreover, in the exemplary embodiment, the communications device 20 is configured to capture authentication data from users desiring to conduct a transaction that requires accessing the protected resources stored in the server system 12. The communications device 20 includes at least one of buttons and icons configured to at least enter commands, enter data and invoke applications stored therein. Moreover, the communications device 20 includes a display screen such as, but not limited to, a Liquid Crystal Display (LCD), and is configured to display any text or image on the display screen. In the exemplary embodiment, the communications device 20 is a portable cellular phone configured to at least display messages and images, capture authentication data from a user, and transmit the captured authentication data to the BAC system 16.

Although the device 20 is a portable cellular phone in the exemplary embodiment, it should be appreciated that in other embodiments the communications device 20 may be any portable communications device capable of at least displaying messages and images, and capturing and transmitting authentication data. Such other portable communications devices include, but are not limited to, a smart phone and any type of portable communications device having wireless capabilities such as a personal digital assistant (PDA).

Although the communications device 20 is configured to capture biometric data in the exemplary embodiment, it should be appreciated that in other embodiments the communications device 20 may be configured to capture any type of authentication data that facilitates verifying the identity of a user desiring to conduct a transaction that requires access to the data stored in the server system 12. Such other types of authentication data include, but are not limited to, GPS coordinates and unique pass-phrases. Thus, in other embodiments, the communications device 20 may be configured to determine the GPS coordinates of the device 20 and transmit the GPS coordinates to the BAC system 16. By determining the GPS coordinates of the device 20 and transmitting the GPS coordinates of the device 20 to the BAC system 16, the GPS coordinates of the device 20 may be compared against the geographical area to determine whether the identity of the user desiring to conduct the transaction may be authenticated.

The server system 12 includes a processor (not shown) and a memory (not shown), the BAC system 16 includes a processor (not shown) and a memory (not shown), the communications device 20 includes a processor (not shown) and a memory (not shown), and the workstation 14 includes a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the memories (not shown) of the server system 12, the BAC system 16, the communications device 20 and the workstation 14, respectively. The above examples are exemplary only, and are thus not intended to limit in any way the definition and/or meaning of the term "processor."

The memories (not shown) in the server system 12, the BAC system 16, the communications device 20 and the workstation 14, can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

The memory (not shown) can be a computer-readable recording medium used to store data in the server system 12, the BAC system 16, the communications device 20 and the workstation 14, and store computer programs or executable instructions that are executed by the server system 12, the BAC system 16, the communications device 20 and the workstation 14. Moreover, the memory (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program.

It should be appreciated that the at least one workstation 14, the network 18 and the server system 12 together constitute a first communications channel. Moreover, it should be appreciated that the communications network 22 and the communications device 20 together constitute a second communications channel separate and distinct from the first communications channel.

In the exemplary embodiment, a user purchases the communications device 20 from a distributor authorized to register, and optionally enroll, the communications device 20 in the BAC system 16. Specifically, upon selling the communications device 20 to the user, the distributor stores the communications device identifier of the communications device 20 in the BAC system 16. Moreover, the distributor sets a state of the communications device 20 as not enrolled such that the non-enrolled state is associated with the communications device identifier in the BAC system 16. By virtue of storing the communications device identifier and associating the communications device identifier with the non-enrolled state in the BAC system 16, the communications device 20 is registered in the BAC system 16.

Figure 2:
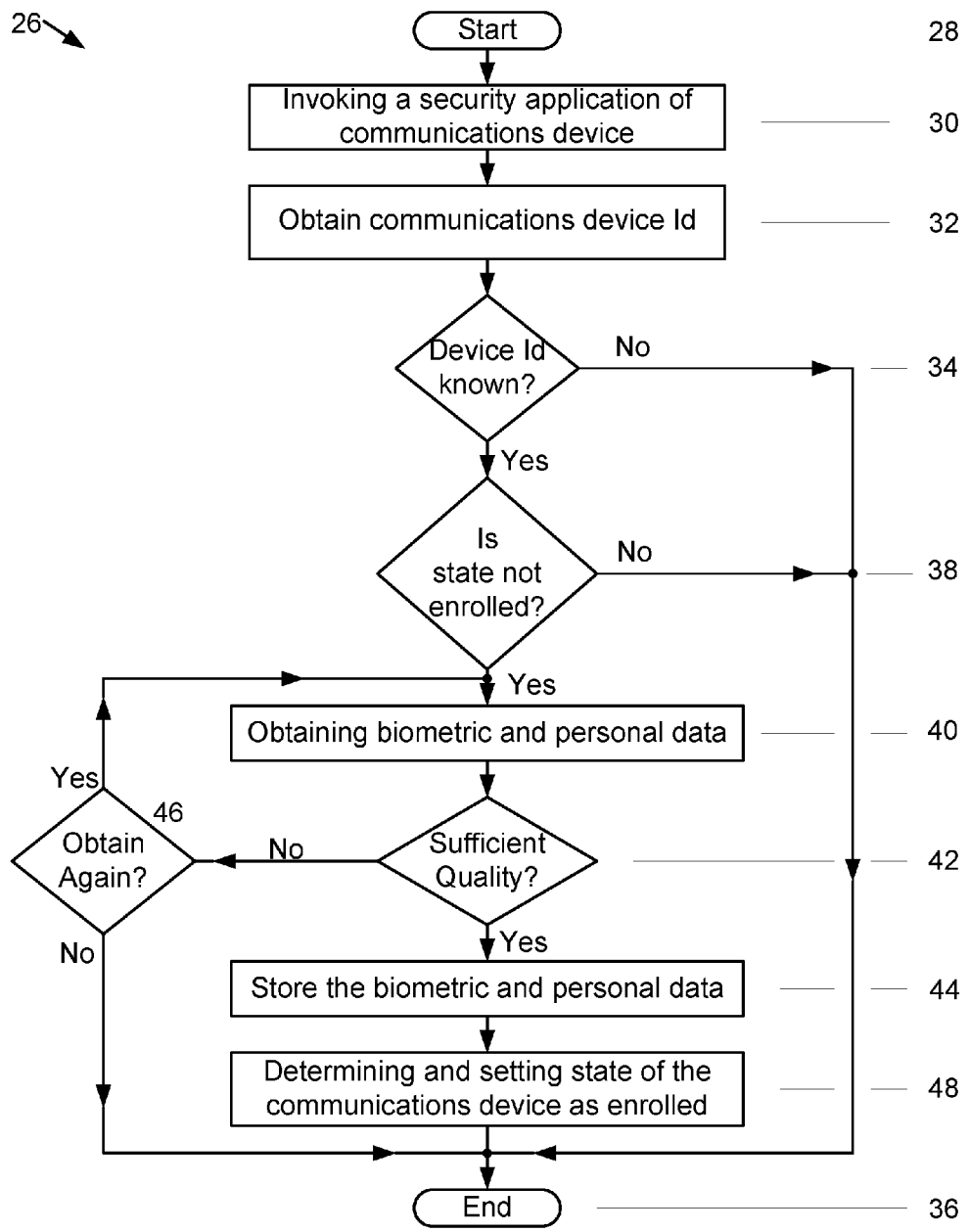
FIG. 2 is a flowchart illustrating an exemplary process for enrolling a communications device in an authentication system included in the AC System illustrated in FIG. 1.

FIG. 2 is a flowchart 26 illustrating an exemplary process for enrolling a communications device 20 in the BAC system 16. The process starts 28 by invoking 30 a security application stored in the communications device 20 by activating an icon or button of the communications device 20. After invoking 30 the security application, the communications device identifier of the communications device 20 is obtained 32. Next, the communications device 20 initiates communications with the BAC system 16 and transmits the communications device identifier to the BAC system 16. After receiving the communications device identifier, the BAC system 16 determines whether or not the communications device 20 is known 34. Specifically, the BAC system 16 compares the received communications device identifier against the communications device identifiers stored therein, and determines that the communications device 20 is known 34 when the received communications device identifier matches one of the communications device identifiers stored therein. When the received communications device identifier does not match one of the communications device identifiers stored in the BAC system 16, the communications device 20 is not known 34 and processing ends 36.

When the received communications device identifier is determined to be known processing continues by determining the state 38 associated with the one matching communications device identifier. Specifically, the BAC system 16 determines whether the state of the one matching communications device identifier is not enrolled. When the one matching communications device identifier is enrolled 38, processing ends 36. However, when the one matching communications device identifier is not enrolled 38 processing continues by obtaining 40 required biometric and personal data of the user associated with the communications device 20, and determining whether the obtained biometric data is of sufficient quality 42 to be used for authenticating the identity associated with the communications device 20. It should be appreciated that the BAC system 16 determines which biometric and personal data are to be captured or obtained in accordance with the authentication policies or rules stored therein. When the obtained biometric data is of sufficient quality 42, processing continues by storing 44 the obtained biometric and personal data in the BAC system 16 as enrollment data records, such that the biometric and personal data enrollment records are associated with the one matching communications device identifier. Otherwise, when the obtained biometric data is not of sufficient quality 42, the biometric data may be obtained again 46 to obtain biometric data of sufficient quality to use for authenticating identities as described herein. In the exemplary embodiment, biometric data corresponding to the required biometric data may be captured or obtained six times. When acceptable biometric data is not obtained 46 after six attempts biometric data is no longer obtained, instead, processing ends 36. However, it should be appreciated that in other embodiments biometric data may be captured or obtained 46 any number of times that facilitates authenticating identities as described herein, or until sufficient quality levels are achieved.

Although processing ends 36 in the exemplary embodiment when acceptable biometric data is not obtained 46 after six attempts, it should be appreciated that in other embodiments after six attempts alternative different biometric data may be obtained 40. Moreover, it should be appreciated that in other embodiments any number of different alternative biometric features, as well as any combination of different biometric features, may be obtained as the required biometric data and used for authenticating identities as described herein.

After obtaining biometric data of sufficient quality 42 and storing 44 the obtained biometric and personal data, processing continues by determining that the state of the communications device 20 is enrolled 48. It should be appreciated that in the exemplary embodiment, by storing 44 the biometric and personal data records of the user in the BAC system 16 and by associating the biometric and personal data records with the one matching communications device identifier in the BAC system 16, the communications device 20 is determined to be enrolled in the BAC system 16 and the device 20 is determined to have an enrolled state 48. Thus, in the exemplary embodiment the state of the communications device 20 in the BAC system 16 is set as enrolled 48. After setting 48 the state of the communications device 20, processing ends 36.

It should be appreciated that in the exemplary embodiment the time between registering the communications device 20 in the BAC system 16 and enrolling the communications device 20 in the BAC system 16 may vary. For example, immediately after the distributor registers the communications device 20 in the BAC system 16 the user may elect to have the distributor also enroll the communications device 20 in the BAC system 16 according to the process described herein and as illustrated in FIG. 2. In contrast, after the distributor registers the communications device 20 in the BAC system 16 the user may elect to enroll the communications device 20 at a later time that is more convenient for the user. It should be appreciated that the user may elect to enroll the communications device 20 himself at a later time, or may elect to have any authorized distributor enroll the communications device 20 in the BAC system 16 at a later time. When the user elects to enroll the communications device 20 himself at a later time, the communications device 20 is enrolled according to strict guidelines that require enrolling the communications device 20 within 4 minutes of registration. However, in other embodiments, it should be appreciated that the guidelines may require enrolling the communications device 20 within any time of registration that facilitates ensuring that the biometric and personal data are not obtained from an imposter. Moreover, in other embodiments the guidelines may require enrolling the communications device 20 according to any standard that ensures the biometric and personal data are not obtained from an imposter.

It should be appreciated that in the exemplary embodiment, during enrollment in the BAC system 16 the biometric and personal data are obtained with the communications device 20. However, it should be appreciated that in other embodiments the biometric and personal data may be obtained in any manner that facilitates authenticating the identity of users as described herein, including, but not limited to, loading the required biometric and personal data into the BAC system 16 from external identity management systems or human resource management systems.

Although the identity of the financial institution service provider is not obtained from the user in the exemplary embodiment, it should be appreciated that in other embodiments the identity of the financial institution service provider may be obtained from the user and stored in the BAC system 16 such that the financial institution service provider identity is associated with the one matching communications device identifier in the BAC system 16. Moreover, it should be appreciated that in other embodiments a plurality of different service providers may be associated with the one matching communications device identifier. That is, the user may provide the identities of a plurality of different service providers that are to be stored in the BAC system 16 and are to be associated with the same one matching communications device identifier in the BAC system 16. It should be appreciated that each different service provider has a corresponding server system 12 that stores therein at least unique user identifiers and corresponding protected resources of respective authorized users. Thus, it should be understood that in other embodiments by virtue of the communications device identifier being associated with each of the different service provider identities, the BAC system 16 may be associated with each of the corresponding server systems 12 such that the BAC system 16 is able to determine the server systems 12 to communicate with for each user.

Although the BAC system 16 determines the state of the communications device 20 in the exemplary embodiment, it should be appreciated that in other embodiments the state of the communications device 20 may be determined by at least the server system 12, the communications device 20 and the workstation 14. Moreover, it should be appreciated that although the unique user identifier is not stored in the BAC system 16 in the exemplary embodiment, in other embodiments the unique user identifier may be stored in the BAC system 16 such that the unique user identifier is associated with a corresponding communications device identifier and enrollment data records stored therein.

Figure 3:
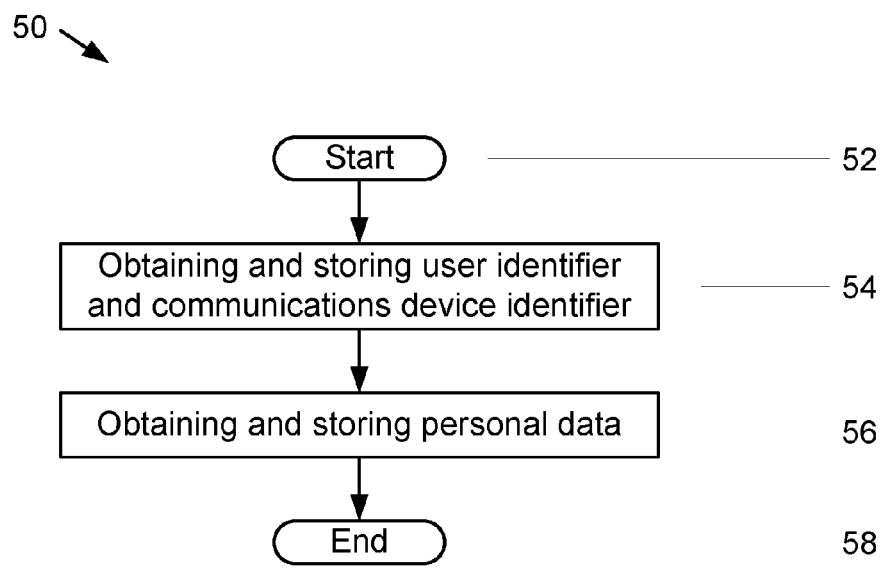
FIG. 3 is a flowchart illustrating an exemplary process of enrolling a user in a computer system of a service provider.

FIG. 3 is a flowchart 50 illustrating an exemplary process for enrolling a user in the server system 12. The process starts 52 by obtaining 54 a unique user identifier from an authorized user and obtaining the communications device identifier of the communications device 20 of the authorized user. The server system 12 stores 54 the unique user identifier and the communications device identifier therein such that the unique user identifier is associated with the protected resources of the authorized user and such that the communications device identifier is associated with the unique user identifier. After obtaining 54 and storing 54 the unique user identifier and the communications device identifier, required personal data of the user is obtained 56 and stored 56 in the server system 12 such that the personal data is associated with the corresponding unique user identifier and communications device identifier. Processing then ends 58.

In the exemplary embodiment, the communications device identifier is also stored in the BAC system 16 such that the communications device identifier is associated with the biometric and personal data of the authorized user stored in the BAC system 16. It should be understood that by virtue of associating the communications device identifier with the unique user identifier in the server system 12, and associating the communications device identifier with the biometric and personal data of the authorized user stored in the BAC system 16, the communications device identifier functions to map data stored in the server system 12 associated with the unique user identifier to data stored in the BAC system 16 associated with the communications device identifier. Thus, it should be appreciated that in the exemplary embodiment information stored in the server system 12 facilitates mapping between data stored in the server system 12 and data stored in the BAC system 16.

Although the unique user identifier is stored in the server system 12 and the communications device identifier is stored in both the server system 12 and the BAC system 16 in the exemplary embodiment, it should be appreciated that in other embodiments the unique user identifier may be stored in both the server system 12 and the BAC system 16, while the communications device identifier may be stored in only the BAC system 16. It should be understood that in other embodiments the unique user identifier may be stored in the BAC system 16 such that the unique user identifier is associated with the corresponding communications device identifier. Thus, in other embodiments, the unique user identifier may function to map data stored in the BAC system 16 that is associated with the authorized user's communications device identifier to data stored in the server system 12 that is associated with the unique user identifier. Consequently, in other embodiments, information stored in the BAC system 16 may be used to facilitate mapping between data stored in the BAC system 16 and data stored in the server system 12.

FIG. 4 is a diagram illustrating a first exemplary configurable policy 60 that is stored in the server system 12 and is for associating a level of risk with each type of network-based transaction 62. Specifically, the policy 60 includes different types of network-based transactions 62 requested by a user and a corresponding level of risk 64 such that each network-based transaction 62 is associated with a level of risk 64. In the exemplary embodiment the network-based transactions 62 may include, but are not limited to, viewing regional office locations, viewing active accounts, viewing the active account balances, withdrawing funds from the active accounts, transferring funds from the active accounts and closing any of the active accounts. However, in other embodiments it should be appreciated that the network-based transactions 62 may be any appropriate transaction that may be conducted with a financial institution.

The levels of risk 64 define categories or degrees of risk associated with a transaction 62 that vary from a highest level of risk 64 to a lowest level of risk 64. In the exemplary embodiment, transactions 62 that access a customer's active accounts, or that access regional office data of the financial institution, are considered to have a lowest level of risk. Consequently, a transaction 62 that accesses a customer's active accounts or regional office data is assigned a lowest level of risk 64. A transaction 62 that accesses the account balances of each of the active accounts warrants a greater degree of security because the account balances constitute privileged information. Thus, transactions 62 that access the account balances are assigned a low level of risk 64. A transaction 62 that withdraws funds from any of the active accounts warrants an even greater degree of security because preventing unauthorized withdrawals is a primary concern of the customer and a primary responsibility of the financial institution. Consequently, a transaction 62 that withdraws funds is assigned a high level of risk 64. A transaction 62 that closes an account is assigned a highest level of risk 64 because customers and financial institutions are concerned about unauthorized account closings.

It should be understood that in the exemplary embodiment the policy 60 is generated by associating each of the plurality of network-based transactions 62 with a corresponding one of the levels of risk 64. Moreover, it should be understood that in the exemplary embodiment, the policy 60 may be reconfigured by defining the types of transactions 62 and the levels of risk 64 in any desirable manner that facilitates authenticating the identity of a workstation user as an authorized user. Furthermore, the policy 60 may be reconfigured by changing the definitions of the transactions 62 and the levels of risk 64. Although the exemplary embodiment includes one configurable policy 60 stored in the server system 12, it should be appreciated that in other embodiments any number of configurable policies 60 may be generated and stored in the server system 12. That is, in other embodiments, additional configurable policies 60 may be included that are appropriate for other businesses or entities, such as, but not limited to, hospitals. Such additional policies 60 may include any transaction 62 appropriate for the business or entity, such as, but not limited to, transactions requesting a patient's medical history records.

FIG. 5 is a diagram illustrating an exemplary configurable authentication policy 66 that is stored in the BAC system 16, and is for associating each of the levels of risk 64 with a corresponding biometric authentication data requirement 68. Specifically, the authentication policy 66 includes the same level of risk 64 definitions established in the first configurable policy 60, as well as a biometric authentication data requirement 68 for use in authenticating the identity of a user. The authentication policy 66 is generated by associating a biometric authentication data requirement 68 with each type of network-based transaction commensurate with the identified level of risk 64. Thus, each level of risk 64 that is associated with a network-based transaction 62 in the first exemplary policy 60 is also associated with an appropriate one of the biometric authentication data requirements 68 in the authentication policy 66.

It should be appreciated that the biometric authentication data requirements 68 indicate at least one biometric feature that is to be captured from a user to authenticate the identity of the user as an authorized user. The biometric features that are to be captured and used for identity authentication are determined by the level of risk 64. It should be appreciated that the higher the level of risk 64 the more demanding the biometric authentication data requirement 68.

In order to facilitate enhancing increased trust in the authentication results, as the level of risk 64 associated with a transaction 62 increases the number of different biometric features required for authentication also increases. For example, a transaction 62 having a low level of risk 64 requires biometric data of a single biometric feature such as voice biometric data. A transaction 62 having a high level of risk 64 requires biometric data of a plurality of different biometric features such as face and iris biometric data. It should be appreciated that the biometric authentication data requirement 68 for a level of risk 64 may be a combination of the biometric authentication data requirements 68 appropriate for lesser levels of risk 64. For example, the biometric authentication data requirement 68 for the highest level of risk 64 may be a combination of the biometric authentication data requirements 68 of the high and low levels of risk 64.

It should be understood that the authentication policy 66 may be reconfigured by defining the biometric authentication data requirements 68 and the levels of risk 64 in any desirable manner that facilitates authenticating the identity of a user as an authorized user. Moreover, the policy 66 may be reconfigured by changing the definitions of the biometric authentication data requirements 68 and the levels of risk 64. For example, the biometric authentication data requirement 68 for a high level risk 64 may be reconfigured such that the appropriate biometric authentication data requirement 68 stipulates authenticating the user with face, iris and fingerprint biometric data, instead of face and iris biometric data. Although the exemplary embodiment includes one authentication policy 66 stored in the BAC system 16, it should be appreciated that in other embodiments any number of authentication policies 66 may be generated and stored in the BAC system 16. It should be understood that changes in levels of risk 64 are to be coordinated between the first configurable policy 60 and the authentication policy 66.

FIG. 6 is a diagram 70 illustrating exemplary risk factors 72 and associated level of risk adjustments 74 that are for adjusting the levels of risk 64. It should be understood that the levels of risk 64 associated with the transactions 62 are not static measurements, but instead are dynamic measurements that may be influenced by a variety of risk factors 72. Such risk factors 72 are defined by the BAC system 16 and may include, but are not limited to, the time of day biometric data is captured by the communications device 20, the distance device 20 is from the home address when a transaction is initiated, and the length of time that has passed since a transaction was previously conducted. Another such risk factor 72 may be the number of times a user has attempted to conduct a transaction within a predetermined time period. That is, whether a user has attempted to conduct a transaction more than a maximum or more than an minimum number of times within a predetermined period of time.

It should be understood that the policy 70 is generated such that each level of risk adjustment 74 is associated with an appropriate one of the risk factors 72 and such that when one of the risk factors 72 is encountered, the level of risk 64 associated with the transaction 62 is adjusted according to the level of risk adjustment 74, prior to determining the biometric authentication data requirement 68. For example, when a user attempts to conduct a transaction accessing the active accounts data after normal business hours, the level of risk adjustment 74 requires increasing the level of risk 64 by one level of risk, that is, from lowest to low. As another example, when a user is located less than or equal to a distance of ten miles from a home address and attempts to conduct a transaction accessing the account balances data 62, the level of risk adjustment 74 requires decreasing the level of risk 64 by one level of risk, that is, from low to lowest. However, if a user is located greater than a distance of ten miles from the home address and attempts to conduct the transaction accessing the account balances data 62, the level of risk adjustment 74 requires increasing the level of risk 64 by one level of risk, that is, from low to high. As yet another example, when a predetermined period of time has elapsed since a user previously attempted to conduct a transaction accessing any of the data stored in the server 12, the level of risk adjustment 74 requires increasing the level of risk 64 by one level of risk. Such predetermined periods of time include, but are not limited to, one day, one week, two weeks, one month and three months. Moreover, it should be appreciated that the predetermined periods of time may be determined by the nature of the business entity. Although the level of risk adjustments 74 described herein involve increasing or decreasing an appropriate level of risk 64 by a single level of risk, it should be appreciated that in other embodiments the level of risk adjustments 74 may be greater than a single level of risk 64.

Users generally access network provided resources remotely and navigate web pages of web sites to conduct transactions therein that require accessing protected resources associated with customer accounts. Such protected resources include, but are not limited to, financial account balances and the amounts of financial account deposits and withdrawals. Such transactions include, but are not limited to, accessing account balances and withdrawing and transferring at least part of the protected resources. For example, customers may desire to remotely check financial account balances or transfer funds electronically to pay everyday bills such as the electric bill. It should be appreciated that due to security concerns associated with passwords used to access web pages over networks such as the Internet, merely entering a username and a password when remotely accessing a web page may not adequately protect access to the protected resources against fraud.

Figure 7:
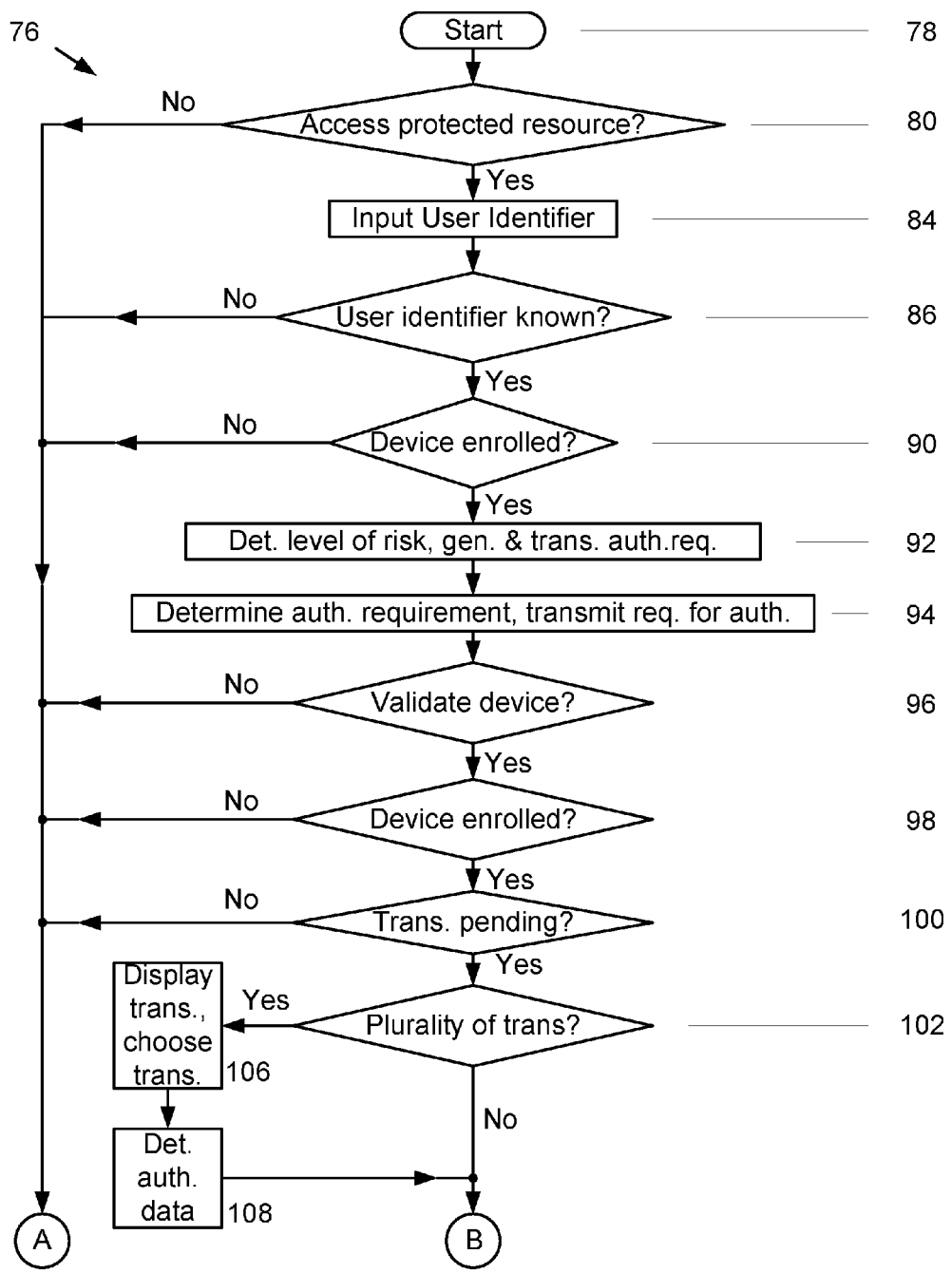
FIG. 7 is a flowchart illustrating an exemplary authentication process for reducing risks that network-based transactions may be conducted fraudulently.
Figure 7A:
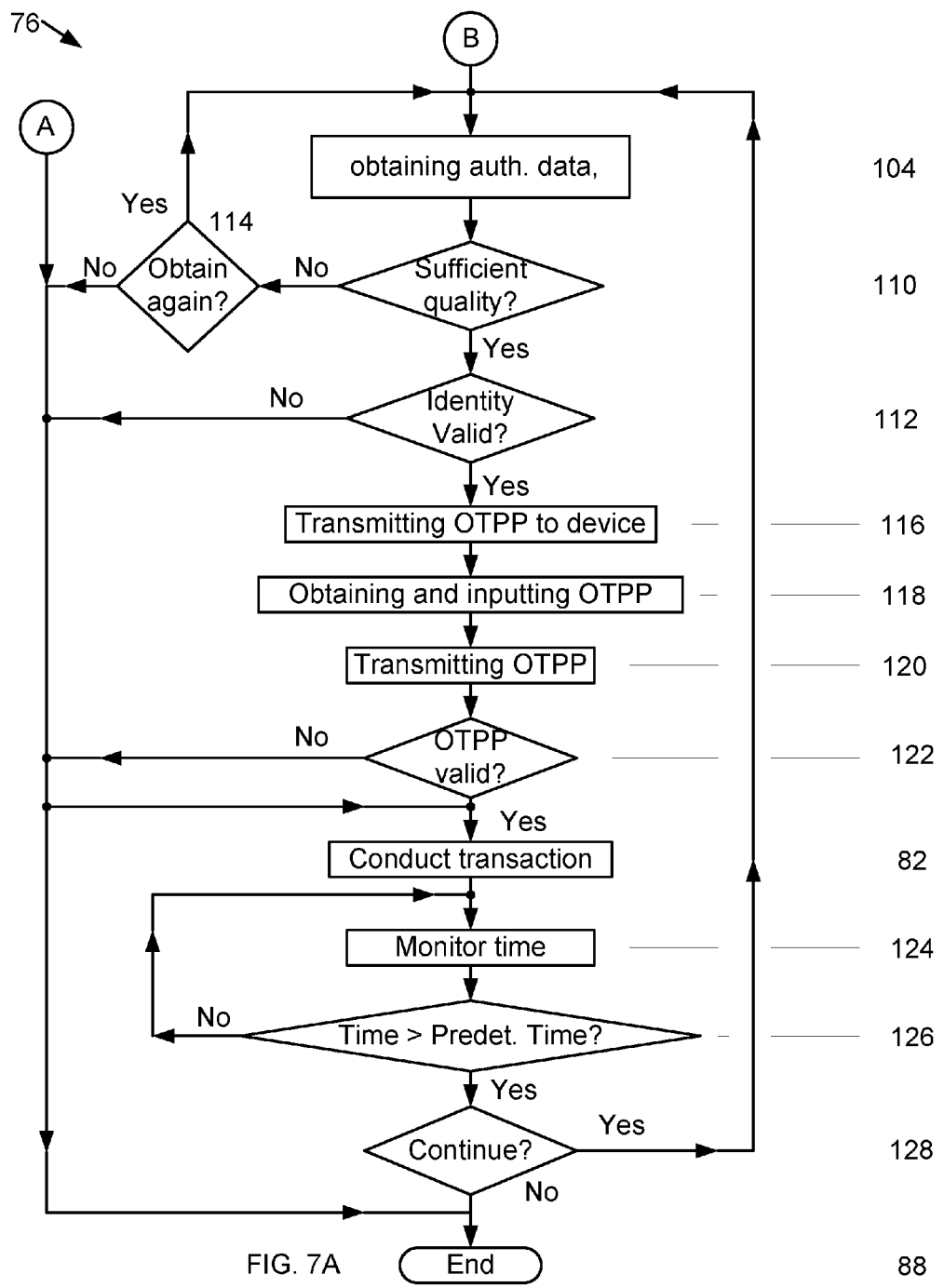
FIG. 7A is a continuation of the flowchart illustrated in FIG. 7.

FIG. 7 is a flowchart 76 illustrating an exemplary authentication process used by the AC system 10 for reducing risks that network-based transactions may be conducted fraudulently, and FIG. 7A is a continuation of the flowchart 76 of FIG. 7. For AC system 10 the process starts 78 when a user at the workstation 14 navigates over a network to a web site of a financial institution service provider and attempts to conduct transactions in the web site. It should be appreciated that the financial institution service provider web site includes resources that are accessible to the general public and protected resources that are not accessible to the general public. Thus, users may conduct transactions 62 involving resources available to the public and conduct transactions 62 involving protected resources. By virtue of navigating the web page to indicate a desire to conduct a transaction 62, the workstation user requests access to resources that are required for the transaction 62.

In order to determine whether or not transactions require access to protected resources 80, the server system 12 determines the level of risk 64 associated with the desired transaction 62. Specifically, the server system 12 compares the desired transaction 62 against the plurality of transactions 62 included in the policy 60 stored therein. When the level of risk 64 associated with the desired transaction 62 is the lowest level of risk 64, access to protected resources is not required 80 and the desired transaction 62 is automatically conducted 82. For example, when the user desires to conduct a transaction 62 merely determining regional office locations of the financial institution service provider, which transaction 62 has a lowest level of risk and thus does not require access to protected resources 80, the server system 12 automatically conducts 82 the desired transaction 62 by presenting the regional office locations on the display of workstation 14. However, when the server system 12 determines that the desired transaction 62 is associated with a level of risk 64 greater than the lowest level of risk 64, the desired transaction 62 requires access to protected resources and authentication is required to conduct the transaction.

Processing continues by prompting the user to input his unique user identifier 84 at the workstation 14. In the exemplary embodiment, the workstation user inputs 84 the unique user identifier into a text box included in the display of the workstation 14. However, it should be appreciated that in other embodiments, any method may be used to input 84 the unique user identifier that facilitates authenticating identities as described herein. Such methods include, but are not limited to, reading the unique user identifier from a smart card.

After inputting the unique user identifier 84, the server system 12 determines whether or not the unique user identifier is known 86 by comparing the inputted unique user identifier against the user identifiers stored therein. When the inputted unique user identifier does not match a user identifier stored in the system 12, the unique user identifier is not known and processing ends 88.

However, when the inputted unique user identifier matches a user identifier stored in the system 12, the inputted unique user identifier is determined to be known 86. Next, the system 12 determines the communications device identifier associated with the matching user identifier and transmits the associated communications device identifier to the BAC system 16. After determining that the unique user identifier is known, the BAC system 16 determines whether the communications device 20 is enrolled 90 therein. Specifically, the BAC system 16 compares the associated communications device identifier against communications device identifiers stored therein. Upon determining a match between the associated communications device identifier and one of the communications device identifiers stored in the BAC system 16, the BAC system 16 consults the state associated with the one matching communications device identifier. When the state of the one matching communications device identifier is enrolled 90, processing continues by determining the level of risk 64 associated with the desired transaction 62, and generating and transmitting an authentication request 92. Otherwise, when the state associated with the one communications device identifier is not enrolled 90, processing ends 88.

After the BAC system 16 determines that the state of the one matching communications device is enrolled 90, the BAC system 16 notifies the system 12 that the communications device 20 associated with the inputted unique user identifier is enrolled. In response, the server system 12 compares the desired transaction 62 against the plurality of transactions 62 included in the policy 60 stored therein, to determine 92 the level of risk 64 associated with the desired transaction 62.

After determining 92 the level of risk 64 associated with the desired transaction 62, the server system 12 generates an authentication request 92 and transmits the authentication request 92 to the BAC system 16 over the first communications channel. It should be understood that the authentication request contains at least an identification number of the server system 12, a transaction identifier, the level of risk 64 associated with the desired transaction 62 and a customer identification number. It should be understood that each transaction identifier is an alphanumeric character string that may be any desired combination of letters and numbers.

Next, upon receiving the authentication request, the BAC system 16 extracts the level of risk 64 from the authentication request and consults the authentication policy 66 to determine 94 the biometric authentication data requirement 68 that corresponds to the extracted level of risk 64. The BAC system 16 compares the extracted level of risk against the levels of risk 64 to determine 94 and identify the corresponding biometric authentication data requirement 68. Specifically, the biometric authentication data requirement 68 is determined 94 to be the biometric authentication data requirement 68 that corresponds to the level of risk 64 that matches the extracted level of risk. After determining 94 the biometric authentication data requirement 68, the BAC system 16 generates a biometric authentication data capture request and transmits the biometric authentication data capture request to the server system 12 over the first communications channel. The biometric authentication data capture request includes the biometric authentication data requirement 68. It should be appreciated that in other embodiments upon receiving the authentication request, the BAC system 16 may automatically transmit a message to the communications device 20 over the second communications channel. Such messages include, but are not limited to, messages that wake-up the device 20 or that invoke the security application stored in the device 20.

Upon receiving the biometric authentication data capture request, the server system 12 generates and transmits a message to the workstation 14 that includes the biometric authentication data requirement 68. In response, the user obtains the communications device 20 and invokes the security application stored therein by activating an icon or button of the communications device 20. After invoking the security application, the communications device identifier of the communications device 20 is obtained. Next, the security application causes the communications device 20 to initiate communications with the BAC system 16 and transmit the communications device identifier to the BAC system 16. After receiving the communications device identifier, the BAC system 16 validates 96 the communications device 20 by determining whether the communications device 20 is known. Specifically, the BAC system 16 compares the received communications device identifier against the communications device identifiers stored therein, and determines that the communications device 20 is known when the received communications device identifier matches one of the communications device identifiers stored therein. Otherwise, when the received communication device identifier does not match one of the communications device identifiers stored in the BAC system 16, the communications device 20 is not validated 96, and processing ends 88.

After validating 96 the communications device 20, processing continues by determining whether or not the communications device 20 is enrolled 98 in the BAC system 16. Specifically, the BAC system 16 determines whether the state of the one matching communications device identifier is enrolled. When the state of the one matching communications device identifier is not enrolled 98 in the BAC system 16, processing ends 88. However, when the state of the one matching communications device identifier is enrolled 98, the BAC system 16 continues by determining whether or not a transaction is pending 100 for the communications device 20. If a transaction is not pending 100, processing ends 88. However, if a transaction is pending 100, processing continues such that the BAC system 16 determines whether or not a plurality of transactions is pending 102. It should be appreciated that transactions 62 are considered to be pending when the user indicates a desire to conduct a transaction 62, but does not biometrically authenticate as required to complete the transaction 62.

It should be appreciated that in the exemplary embodiment, a plurality of transactions 62 requiring biometric authentication may be pending simultaneously. For example, after navigating to the website of the financial institution service provider and indicating a desire to conduct a transaction 62 for withdrawing funds, the user may decide not to authenticate as required to complete the transaction 62. Instead, the user may decide to open another window and navigate to the web site of a hospital and indicate a desire to conduct a transaction 62 for reviewing his health records, and decide not to biometrically authenticate as required to complete the hospital transaction. By virtue of not authenticating as required to withdraw funds, and not authenticating to review the health records, each of these transactions is considered to be a pending transaction. Thus, a plurality of transactions 62 may be pending simultaneously in the exemplary embodiment. It should be appreciated that each of the plurality of transactions remains pending for a finite period of time. That is, in the exemplary embodiment, each of the pending transactions expires two minutes after the user indicates a desire to conduct the transaction 62. However, it should be appreciated that in other embodiments each of the pending transactions may expire after any length of time that facilitates authenticating identities as described herein.

If a plurality of transactions is not pending 102, processing continues by obtaining the biometric data capture request and capturing 104 biometric authentication data 68 in accordance with the biometric data capture request. However, when a plurality of transactions is pending 102 processing continues by displaying 106 the pending transactions 62 in the display of the communications device 20. The user chooses one of the displayed transactions 106 to conduct, the server system 12 determines the level of risk 64 associated with the chosen transaction 106, and the BAC system 16 determines 108 the biometric authentication data requirement 68 associated with the chosen transaction 106. Processing then continues by requesting 104 the biometric authentication data 68 determined at operation 108. Although the exemplary embodiment uses the authentication policy 66 to determine the biometric authenticate data requirement 68, it should be appreciated that in other embodiments an authentication policy may not be available. In such other embodiments, all available data may be collected regardless of the transaction type, the data obtained may be determined by the user, the user may be repeatedly prompted for authentication data until sufficient authentication data is obtained, or the BAC system 16 may determine not to proceed.

It is assumed that the authorized user associated with the inputted unique user identifier is in possession of the device 20 and can be contacted using the communications device 20. Thus, by virtue of validating the device 96 and transmitting the biometric authentication data capture request to the communications device 20, the biometric authentication data capture request is considered to be transmitted to the authorized user associated with the inputted unique user identifier. It should be understood that the authentication data is to be captured by and transmitted from a single communications device that is out-of-band with the workstation 14. That is, any communications device separate and distinct from the workstation 14, and that communicates on a different channel than the workstation 14. Communications device 20 is such an out-of-band communications device. Thus, after reading, or obtaining, the biometric authentication data capture request transmission from the communications device display, the user obtains or captures biometric authentication data 104 in accordance with the biometric authentication data capture request transmission with the communications device 20.

Next, in the exemplary embodiment, the BAC system 16 evaluates the captured biometric data to verify that the captured biometric data is of sufficient quality 110 usable in determining a sufficient quality comparison match and related numerical score. When biometric data of sufficient quality is obtained 110, processing continues by authenticating the identity 112 of the workstation user as the authorized user. However, when the quality of the obtained biometric data is insufficient 110, processing continues by again capturing 114 all of the requested biometric authentication data. It should be appreciated that part of the captured biometric data may be of sufficient quality while other parts of the captured biometric data may be of insufficient quality. Thus, in other embodiments only the captured biometric data of insufficient quality may be captured or obtained again 114. Moreover, in other embodiments instead of capturing the same biometric data again 114, additional different biometric authentication data may be captured in order to achieve a required biometric data confidence level.

In the exemplary embodiment, biometric authentication data corresponding to the requested biometric authentication data may be captured 114 six times. When acceptable biometric authentication data is not captured after six attempts, processing ends 88. However, it should be appreciated that in other embodiments biometric data may be captured any number of times 114.

Although processing ends 88 in the exemplary embodiment when acceptable biometric authentication data is not provided after six attempts, it should be appreciated that in other embodiments after six attempts, instead of capturing 114 the same biometric data again, different biometric authentication data may be requested 104 for authentication, captured 104, and evaluated for sufficient quality 110. Moreover, it should be appreciated that in other embodiments any number of different alternative biometric features, as well as any combination of different alternative biometric features, may be captured 104 as biometric authentication data. After a user has repeatedly captured biometric data 104, 110, 114 of insufficient quality, the user may contact the financial institution service provider and notify the financial institution service provider that a problem may exist in the authentication system.

Next, processing continues by transmitting the captured biometric data from the communications device 20 to the BAC system 16 over the second communications channel, and validating the identity of the user 112. More specifically, the captured biometric data is compared 112 against biometric data of an authorized user that is associated with the one matching communications device identifier that is stored in the BAC system 16. The comparison 112 is such that a numerical score, based on the quality of the comparison match, is determined for at least one biometric comparison match. It should be appreciated that a numerical score based on the quality of a comparison match, may be determined for each of a plurality of different biometric comparison matches. Thus, a plurality of numerical scores may also be determined. The numerical scores for each comparison match are combined using any desirable mathematical computation to yield a confidence score, and the user is identified as the authorized user associated with the entered user identifier when the confidence score is at least equal to a predetermined threshold value. It should be appreciated that the confidence scores are based on how well captured biometric data match against the corresponding biometric data stored in the BAC system 16.

By virtue of being at least equal to the predetermined threshold value, the confidence scores reflect an adequate level of trust in the authentication result. Moreover, it should be appreciated that as the margin by which the confidence score exceeds the predetermined threshold increases, the trust in the authentication result also increases. The predetermined threshold value may be changed depending on factors such as, but not limited to, the time of year. For example, during the Christmas shopping season the likelihood of fraud may be greater than during other times of the year. Consequently, the predetermined threshold value may be increased during the Christmas shopping season. However, it should be appreciated that the predetermined threshold value may be changed on any basis that facilitates validating the identity of a user 112 as described herein.

When the identity of the workstation user is validated 112 as the authorized user associated with the inputted unique user identifier, the BAC system 16 generates, stores and transmits a one-time pass-phrase (OTPP) 116 to the communications device 20 over the second communications channel, and the communications device 20 automatically displays the transmitted OTPP. Otherwise, when the identity of the user at workstation 14 is not validated 112 as being the authorized user associated with the inputted unique user identifier, processing ends 88.

After transmitting the OTPP 116 to the communications device 20, the communications device 20 displays the OTPP transmission such that the user is able to obtain 118 the received OTPP by reading the communications device 20 display, and manually enters 118 the OTPP into a pass-phrase text input box at the workstation 14. Next, the workstation 14 transmits 120 the OTPP to the server system 12, and the server system 12 in turn transmits 120 the OTPP to the BAC system 16 for validation 122.

The BAC system 16 validates 122 the OTPP by comparing the OTPP received from the server system 12 against the OTPP stored in the BAC system 16 and transmitted to the communications device 20 by the BAC system 16. Moreover, the BAC system 16 verifies that the OTPP has not expired. When the OTPP received from the server system 12 matches the OTPP transmitted to the communications device 20, and the OTPP has not expired, the OTPP is validated 122 and the user is permitted to conduct 82 the desired transaction 62. It should be appreciated that upon successfully validating 122 the OTPP, a message indicating that the OTPP was validated is presented to the user at the workstation 14 and the OTPP is deleted from each element of the AC system 10. Otherwise, when the OTPP is not successfully validated 122, processing ends 88. Although the exemplary embodiment compares the OTPP received from the server system 12 against the OTPP transmitted to the communications device 20, it should be appreciated that in other embodiments the received OTPP may be compared against a specific transaction from the financial institution service provider. It should be appreciated that in addition to facilitating increased trust in authentication results, that providing the OTPP facilitates implementing the authentication process described herein on legacy type computer systems.

After granting the user access to the protected resources to conduct 82 the desired transaction 62, the server system 12 monitors the time 124 which has elapsed since access was granted 82. When a predetermined time period has elapsed 126, such as fifteen minutes, access to the financial institution web page is denied. It should be appreciated that after access is granted 82, the server system 12 also monitors the time 124 during which no transactions are performed on the webpage. Access to the financial institution web page is also denied after a predetermined period of inactivity, such as five minutes. After access is denied 126, the user may indicate whether or not he would like to continue 128 accessing the financial institution service provider web page. When the user desires to continue 128 accessing the financial institution web page 126, processing continues by capturing the requested biometric authentication data 104. Otherwise, when the user does not desire to continue accessing 128 the financial institution web page, processing ends 88. Thus, in the exemplary embodiment the process illustrated by the flowchart 76 enables network-based transactions to be conducted with greater security and thereby facilitates reducing risks that network-based transactions may be conducted fraudulently.

Although the user chooses one of the displayed pending transactions 106 in the exemplary embodiment, it should be appreciated that in other embodiments the server system 12 and BAC system 16 may automatically determine a single biometric authentication data requirement 68 that facilitates simultaneously authenticating all of the pending transactions such that the user may conduct all of the pending transactions after a single authentication. Specifically, in such other embodiments, the server system 12 may consult the policy 60 to determine the level of risk 64 associated with each pending transaction 62. Next, the server system 12 may compare the levels of risk for each transaction and determine which transaction has the greatest level of risk 64. The server system 12 then communicates the greatest level of risk 64 to the BAC system 16 such that the BAC system 16 is able to determine the biometric authentication data requirement 68 corresponding to the greatest level of risk 64. The BAC system 16 then includes at least the determined biometric authentication data requirement 68 in a subsequent biometric authentication data capture request and transmits the request to the server 12. The biometric authentication data corresponding to the greatest level of risk 64 is captured with the device 20 and used to authenticate the user. It should be understood that by virtue of authenticating to the greatest level of risk 64, all of the other pending transactions are also adequately authenticated because the other pending transactions necessarily have a lower level of risk 64.

Although the BAC system 16 transmits a message to the server system 12 after determining the biometric authentication data requirement 68 at operation 94 in the exemplary embodiment, it should be appreciated that in other embodiments, after determining the biometric authentication data requirement 68 at either of operations 94 and 108, the BAC system 16 may generate and transmit a biometric authentication data capture request directly to the communications device 20, over the second communications channel. Upon receiving the biometric authentication data capture request transmission, the communications device 20 verifies that the biometric authentication data capture request was transmitted from the BAC system 16. When it is determined that the biometric authentication data capture request was transmitted from the BAC system 16, the security application stored in the device 20 causes the device 20 to display the authentication data capture request. However, when the biometric authentication data capture request cannot be verified as being transmitted from the BAC system 16, processing ends.

Although the BAC system 16 verifies that the OTPP transmitted from the server system 12 is the same as that transmitted to the communications device 20 from the BAC system 16 in the exemplary embodiment, it should be appreciated that in other embodiments any other device may verify an OTPP match that facilitates verifying the identity of a user as described herein. For example, instead of transmitting the OTPP only to the communications device 20, the BAC system 16 may also transmit the OTPP to the server system 12 at the same time the OTPP is transmitted to the communications device 20. By virtue of simultaneously transmitting the OTPP to the server 12 and the communications device 20, the OTPP verification may be securely performed at the server 12. Doing so facilitates reducing the time required to authenticate and grant access to a user.

Although the exemplary embodiment describes protected resources stored as electronic data in the server system 12 that are accessible over the internet, it should be appreciated that in other embodiments the protected resources may take any form and be accessed in any manner. For example, in other embodiments the protected resource may be a box containing one million dollars that is stored in a room. The room may have a door with an electronic lock system, configured to communicate with the system 12 and the BAC system 16, that is capable of reading a smart card to input the unique user identifier of an individual attempting to gain access. Such an electronic lock system may facilitate authenticating an individual in accordance with the authentication process described above and as illustrated in FIGS. 7 and 7A, to reduce risks that a transaction involving removing the protected resource from the room is not conducted fraudulently. Upon properly authenticating the individual the electronic lock system opens the door to permit access to the protected resource. It should be appreciated that instead of navigating to a web page as in the exemplary embodiment, in other embodiments a workstation user may merely activate a thick client application stored in the workstation 14.

Although the exemplary embodiment uses captured biometric data for verifying the identity of the user as the authorized user, it should be appreciated that in other alternative embodiments any kind of data may be used to verify the identity of a user as an authorized user. Such data includes, but is not limited to, GPS coordinates.

Figure 8:
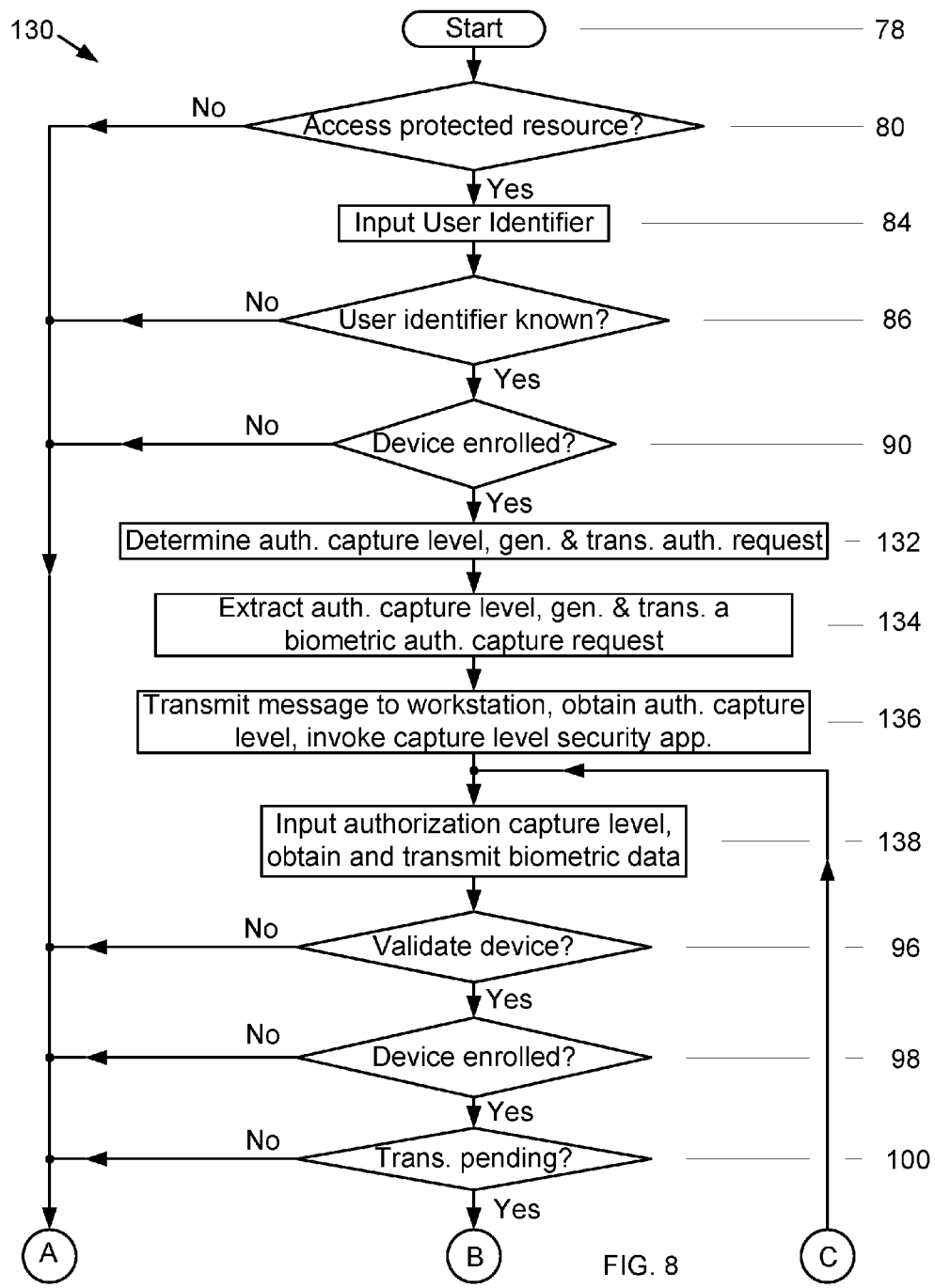
FIG. 8 is a flowchart illustrating an alternative exemplary authentication process for reducing risks that network-based transactions may be conducted fraudulently.
Figure 8A:
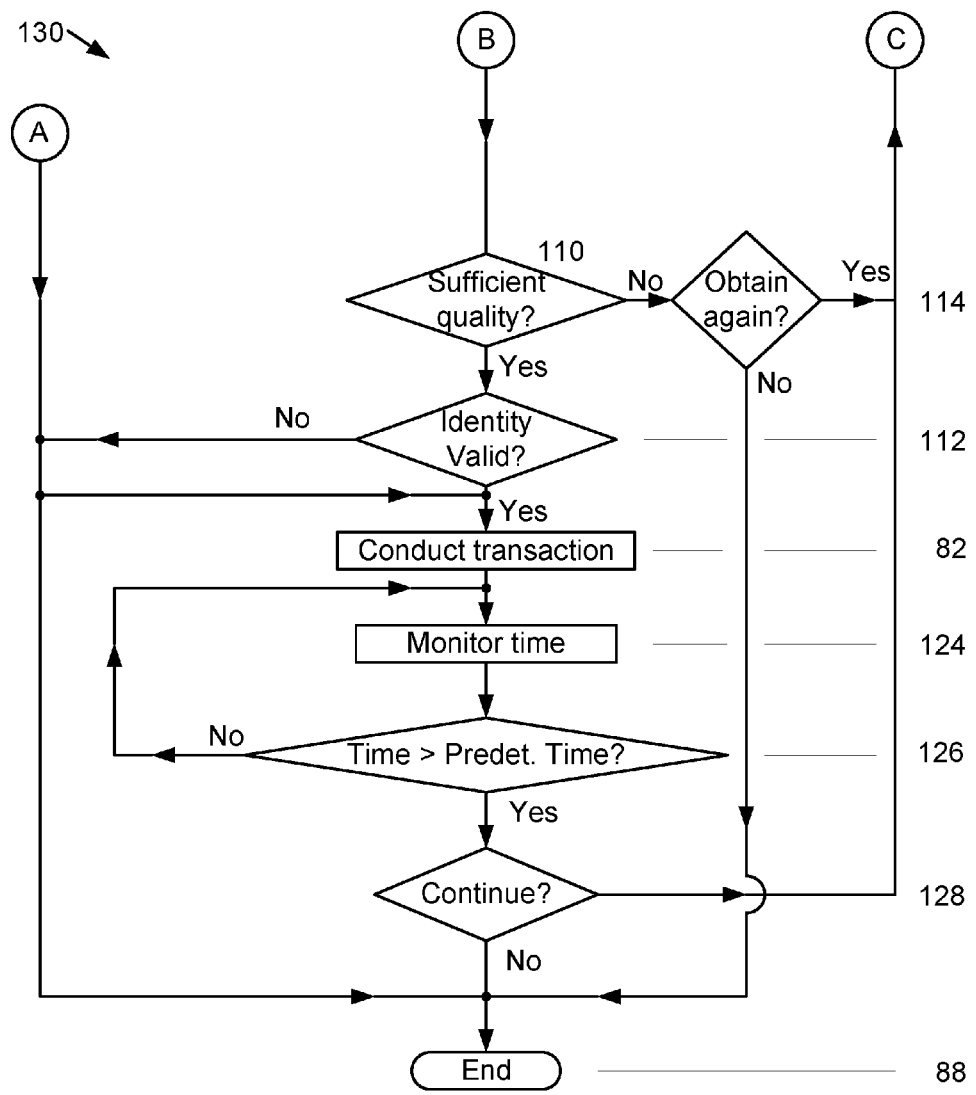
FIG. 8A is a continuation of the flowchart illustrated in FIG. 8.

The information shown in FIGS. 8 and 8A is the same information shown in FIGS. 7 and 7A, respectively, as described in more detail below. As such, components illustrated in FIGS. 8 and 8A that are identical to components illustrated in FIGS. 7 and 7A, are identified using the same reference numerals used in FIGS. 7 and 7A.

FIG. 8 is a flowchart 130 illustrating an alternative exemplary authentication process used by the AC system 10 for reducing risks that network-based transactions may be conducted fraudulently, and FIG. 8A is a continuation of the flowchart 130 of FIG. 8. This alternative embodiment is similar to that shown in FIGS. 7 and 7A, respectively. However, the biometric authentication data requirement 68 is determined by a capture level security application stored in the communications device 20. More specifically, after determining 90 that the communications device 20 associated with the inputted unique identifier is enrolled 90, the server system 12 determines 132 the level of risk 64 of the desired transaction 62, and generates and transmits an authentication request to the BAC system 16. In response to the authentication request, the BAC system 16 determines an authentication capture level 134 corresponding to a biometric authentication requirement 68 of the desired transaction 62. Moreover, the BAC system 16 generates and transmits a biometric authentication data capture request 134 including at least the authentication capture level to the server system 12. Furthermore, it should be appreciated that the biometric authentication data capture request specifies that the capture level security application included in the device 20 is to be used for determining the biometric authentication data requirement 68 for the desired transaction 62 through use, in part, of the authentication capture level 134 specified in the capture level message transmitted by the server system 12.

In this alternative embodiment each level of risk 64 is associated with an authentication capture level. Specifically, the lowest, low, high and highest levels of risk 64 are associated with authentication capture levels 1, 2, 3 and 4, respectively. For example, a transaction 62 to withdraw funds is associated with an authentication capture level of 3 because withdrawing funds 62 has a high level of risk 64. Thus, by virtue of being associated with a particular level of risk 64, each of the authentication capture levels is also associated with the biometric authentication data requirement 68 corresponding to the particular level of risk 64. Although this alternative embodiment designates the authentication capture levels with numbers, it should be appreciated that in other embodiments any method may be used to designate the authentication capture levels that facilitates authenticating identities as described herein. Such methods include, but are not limited to, designating the capture levels with letters or colors, or simply using the lowest, low, high, or highest level of risk 64 designations.

Upon receiving the biometric authentication data capture request, the server system 12 transmits a capture level message to the workstation 136 that includes the capture level of the desired transaction 62 and specifies that the capture level security application included in the device 20 is to be used for determining the biometric authentication data requirement 68 for the transaction 62. Upon receiving the authentication capture level transmission, the workstation 14 displays a message including the authentication capture level prompting the user to enter the displayed authentication capture level into the communications device 20. Next, the user obtains the authentication capture level 136 from the workstation 14 and invokes the capture level security application 136 stored in the communications device 20 by activating an appropriate icon or button of the communications device 20.

Upon invoking the capture level security application 136, a message appears on the display of the communications device 20 that prompts the user to input the authentication capture level 138 into the communications device 20. After inputting the authentication capture level 138, the communications device 20 displays the corresponding biometric authentication data requirement 68. For example, after obtaining the authentication capture level of 3 from the workstation 14, the user inputs the capture level of 3 into the device 20. In response to inputting the capture level of 3, the capture level security application causes the communications device 20 to display the biometric authentication data 68 to be captured. Specifically, the communications device 20 displays a message indicating that the user is to capture face and iris biometric data. The user then captures or obtains 138 the biometric data in accordance with the biometric authentication data requirement 68 using the communications device 20, and transmits 138 the captured biometric data from the communications device 20 to the BAC system 16.

After conducting operations 96 and 98, and determining that a transaction is pending 100, processing continues such that the BAC system 16 verifies that biometric data of sufficient quality 110 was captured that may be used to determine a sufficient quality comparison match and related numerical score. When biometric data of sufficient quality is captured 110, processing continues by validating the identity 112 of the user as the authorized user. However, in this alternative embodiment, when the quality of the captured biometric data is not sufficient 110, processing continues by capturing 114 all of the requested biometric authentication data. However, it should be appreciated that in other embodiments a portion of the captured 138 biometric data may be of sufficient quality such that all of the requested biometric authentication data need not be captured or obtained again 114. Thus, in other embodiments, insufficient quality biometric authentication data may be captured again 114 or additional biometric authentication data may be captured in order to achieve a required biometric data confidence level.

In the exemplary embodiment, biometric authentication data corresponding to the requested biometric authentication data may be captured or obtained 114 six times. When acceptable biometric authentication data is not captured after six attempts, processing ends 88. However, it should be appreciated that in other embodiments biometric data may be captured or obtained any number of times 114.

Although processing ends 88 in the exemplary embodiment when acceptable biometric authentication data is not provided after six attempts, it should be appreciated that in other embodiments after six attempts, instead of capturing or obtaining 114 the same biometric data again, different biometric authentication data may be requested and captured 138, and evaluated for sufficient quality 110. Moreover, it should be appreciated that in other embodiments any number of different alternative biometric features, as well as any combination of different alternative biometric features, may be captured 138 as biometric authentication data. After a user has repeatedly captured biometric data 138, 110, 114 of insufficient quality, the user may contact the financial institution service provider and notify the financial institution service provider that a problem may exist in the authentication system.

Next, processing continues by validating the identity of the user 112 in accordance with the method described herein with regard to the exemplary embodiment. When the identity of the workstation user is validated 112 as the authorized user associated with the inputted unique user identifier, the BAC system 16 notifies the server system 12 that the user has been validated as the authorized user and the server system 12 grants the user access to the protected resources required to conduct 82 the desired transaction 62. Thus, in this alternative embodiment the process illustrated by the flowchart 130 also enables network-based transactions to be conducted with greater security and thereby facilitates reducing risks that network-based transactions may be conducted fraudulently.

Although the process described in the alternative embodiment does not include an OTPP, it should be appreciated that in other embodiments an OTPP may be included. In such other embodiments the communications device 20 should also be authenticated by the BAC system 16 when the communications device 20 is validated. It should be appreciated that the user may make a typographical error when manually entering the OTPP. Thus, it should be appreciated that in other embodiments the OTPP may be entered using any method such as, but not limited to, automatically transmitting the OTPP to the workstation 14. Specifically, the OTPP may be automatically transmitted as a result of the user pressing an icon or button on the device 20 in response to a prompt to automatically transmit the OTPP, or the OTPP may be automatically transmitted to the workstation 14 without pressing an icon or button. It should be understood that upon receiving the OTPP, the communications device 20 may prompt the user to select between manually entering the OTPP in the workstation 14 or automatically transmitting the OTPP to the workstation 14. The user may enter an input indicating which to choose by pressing an appropriate icon or button of the communications device 20.

It should be appreciated that in the exemplary embodiments described herein, the workstation 14, server system 12, and network 18 constitute a first communications channel and that the communications device 20 and wireless network 22 constitute a second communications channel. In response to a communication from the first communications channel, subsequent communications are caused to occur over the second communications channel. Specifically, the BAC system 16 initiates an authentication process over the second channel with the device 20 in response to an authentication request received over the first communications channel. The BAC system 16 receives captured biometric data from the device 20 and biometrically authenticates the workstation user. Thus, by virtue of a communication over the first channel, communications are caused to be transmitted and received over the second communications channel that enable facilitating authentication of the workstation user on the first communications channel. Moreover, it should be appreciated that communications over the first channel, occurring after biometric authentication over the second channel, are more secure due to the high level of trust inherent with biometric authentication results.

Attackers that are able to monitor communications and phish for user names and passwords over the first communications channel are not aware of the second communications channel, and thus cannot monitor communications and phish over the second channel. As a result, security of network-based transactions is facilitated to be increased and ease of integration with existing legacy systems is facilitated to be enhanced.

It should be understood that the server system 12, workstation 14, BAC system 16 and communications device 20 may be configured to communicate in any manner, and in any order, to authenticate users as authorized users and thus reduce risks that network-based transactions may be conducted fraudulently.

In the exemplary embodiments described herein, the BAC system 16 authenticates users as authorized users. It should be understood that as described herein the communications device 20 is not configured to store biometric data, is not configured to biometrically authenticate workstation users as authorized users, and is not configured to generate one-time pass-phrases due to security concerns associated with the communications device 20. Specifically, by virtue of being a relatively small and portable device the communications device 20 may be easily lost or stolen. When the communications device 20 is stolen, any confidential data stored therein may be discovered. Thus, if confidential data such as biometric data is stored in the communications device 20, the biometric data may be discovered and used to authenticate an unauthorized user as an authorized user such that the unauthorized user is able conduct fraudulent network-based transactions. By storing confidential enrollment data in the BAC system 16, separate from the communications device 20, the security of the confidential enrollment data is facilitated to be enhanced such that unauthorized users cannot obtain the biometric data to conduct fraudulent network-based transactions.

It should be appreciated that biometrically authenticating identities facilitates increasing the level of trust that a user attempting to conduct a transaction requiring access to protected resources is an authorized user. Moreover, it should be appreciated that providing an OTPP contingent on successfully biometrically authenticating the user enhances the level of trust in an authentication result. Furthermore, it should be understood that by virtue of using an out-of-band communications device, separate and distinct from the workstation 14, for capturing and transmitting biometric data and for receiving and transmitting the OTPP, an additional level of security is provided which also facilitates increasing the trust in an authentication result that indicates a user attempting to access protected resources is an authorized user. By implementing a higher authentication standard, it is more difficult for an unauthorized user to be authenticated as an authorized user. Thus, by virtue of facilitating an increase in trust in an authentication result that indicates a user is an authorized user, the processes and systems described herein facilitate increasing the security of protected resources. Moreover, by virtue of facilitating an increase in the security of protected resources, the processes and systems described herein facilitate reducing risks that network-based transactions will be conducted fraudulently.

The processes and systems described herein facilitate increasing the level of trust in network-based authentication results, and thus facilitate reducing risks that network-based transactions will be conducted fraudulently. The processes and systems described herein are believed to be applicable to many different businesses for reducing risks that network-based transactions associated with these different businesses will not be conducted fraudulently. Although the example embodiment described herein is the financial business, the invention is in no way limited to the financial business. For example, the invention may also be used to facilitate reducing risks that network-based medical record transactions will be fraudulently conducted by an unauthorized user.

In each embodiment, the above-described processes for authenticating the identity of an individual desiring to conduct network-based transactions, facilitate reducing risks that data or information used in conducting the transaction will be obtained and fraudulently used by an unauthorized user. In one exemplary embodiment, a level of risk associated with a transaction is determined each time a workstation user attempts to conduct a transaction, and biometric data corresponding to the level of risk may be captured from the workstation user at a communications device and used for biometrically authenticating the workstation user. Upon proper biometric authentication, a one-time pass-phrase is forwarded to the communications device and transferred from the communications device to the workstation to facilitate authenticating the workstation user as an authorized user.

In yet another exemplary embodiment, a capture level is associated with each level of risk and is entered into a communications device to determine biometric authentication data to be captured and used for authentication. Upon proper biometric authentication, the authorized user is granted access to the protected resources and is permitted to conduct the transaction therein. As a result, in each exemplary embodiment, the level of trust in the authentication result is facilitated to be increased, the level of risk associated with conducting transactions over a network is facilitated to be reduced, and costs incurred due to users perpetuating fraud upon a network are facilitated to be reduced. Accordingly, network-based transaction risks are facilitated to be reduced and network-based transactions are facilitated to be enhanced in a cost effective and reliable manner.

Exemplary embodiments of authentication processes and systems that facilitate reducing risks that network-based transactions will be fraudulently conducted are described above in detail. The processes are not limited to use with the specific computer system embodiments described herein, but rather, the processes can be utilized independently and separately from other processes described herein. Moreover, the invention is not limited to the embodiments of the processes and systems described above in detail. Rather, other variations of the processes may be utilized within the spirit and scope of the claims.

While the invention has been described in terms of various specific embodiments, those skilled in the art will recognize that the invention can be practiced with modification within the spirit and scope of the claims.

What is claimed is:

1. A method of authenticating users comprising:
conducting, by a computing device, a first authentication transaction with data from a memory included in the computing device, the data being a template generated from biometric data captured from the user, the computing device capable of being carried by a user;
conducting a second authentication transaction with a template generated from biometric data captured from the user to authenticate the user when the first authentication transaction is successful, the biometric data for the second transaction being different than the biometric data for the first transaction; and
transmitting a message to an electronic lock system after the user is successfully authenticated in the second authentication transaction, the electronic lock system causes a door lock to unlock after receiving the message, the electronic lock system being in communication with the computing device over a network.

2. The method of authenticating users in accordance with claim 1 further comprising verifying that the captured authentication data for each authentication transaction is sufficient usable to determine a comparison match.

3. The method of authenticating users in accordance with claim 1, said computing device being an authentication computer system.

4. The method of authenticating users in accordance with claim 1, said conducting a first authentication transaction step comprising extracting a risk level from a received authentication request, the risk level being for unlocking the electronic lock and the first authentication data being based on the extracted risk level.

5. The method of authenticating users in accordance with claim 1 further comprising simultaneously capturing, by the computing device, the biometric data for the first and second authentication transactions.

6. A computing device for authenticating users, said computing device capable of being carried by a user and comprising:
a processor; and
a memory configured to store data, said computing device being associated with a network and said memory being in communication with said processor and having instructions stored thereon which, when executed by said processor, cause said computing device to:
conduct a first authentication transaction with data from said memory to authenticate the user, the data being a template generated from biometric data captured from the user;
conduct a second authentication transaction with a template generated from biometric data captured from the user to authenticate the user when the first authentication transaction is successful, the biometric data for the second transaction being different than the biometric data for the first transaction; and
transmit a message to an electronic lock system after the user is successfully authenticated in the second authentication transaction, the electronic lock system causes a door lock to unlock after receiving the message, the electronic lock system being in communication with said computing device over the network.

7. The computing device for authenticating users in accordance with claim 6, said computing device being an authentication computer system.

8. The computing device for authenticating users in accordance with claim 6 wherein when executed by said processor, the instructions further cause said processor to verify that the data for each authentication transaction is usable to determine a comparison match.

9. The computing device for authenticating users in accordance with claim 6, wherein the instructions which when read and executed by said processor cause said processor to conduct the first authentication transaction further cause said processor to extract a risk level from a received authentication request, the risk level being for unlocking the electronic lock and the first data being based on the extracted risk level.

10. The computing device for authenticating users in accordance with claim 6, said computing device being a smart phone.

11. The computing device for authenticating users in accordance with claim 6, said computing device being a tablet computer.

12. The computing device for authenticating users in accordance with claim 6, said computing device being a laptop computer.

13. The computing device for authenticating users in accordance with claim 6, said computing device being a personal digital assistant.

14. The computing device for authenticating users in accordance with claim 6, wherein the instructions which read and executed by said processor further cause said computing device to simultaneously capture the biometric data for the first and second authentication transactions.

15. A method of authenticating users comprising:
conducting, by a computing device, a first authentication transaction with data from a memory included in the computing device, the data being a template generated from biometric data captured from the user, the computing device capable of being carried by a user;

conducting a second authentication transaction with a template generated from biometric data captured from the user to authenticate the user when the first authentication transaction is successful, the biometric data for the second transaction being different than the biometric data for the first transaction; and unlocking a door after the user is successfully authenticated in the second authentication transaction.

16. The method of authenticating users in accordance with claim 15 further comprising verifying that the captured data for each authentication transaction is usable to determine a comparison match.

17. The method of authenticating users in accordance with claim 15, said conducting a first authentication transaction step comprising extracting a risk level from a received authentication request, the risk level being for unlocking the electronic lock and the first data being based on the extracted risk level.

18. The method of authenticating users in accordance with claim 15 further comprising simultaneously capturing, by the computing device, the biometric data for the first and second authentication transactions.

* * * * *